United States Patent [19]

Stoner et al.

[11] Patent Number: 4,703,817
[45] Date of Patent: Nov. 3, 1987

[54] CONTROLLABLE VEHICLE FOR INSPECTING LIMITED ACCESS AREAS

[75] Inventors: Donald R. Stoner, Murrysville; Robert D. Senger, Greensburg, both of Pa.; Norman A. Planck, Oxnard, Calif.; William G. Hall, Manchester, Mo.

[73] Assignee: Westinghouse Electric Corp., Pittsburgh, Pa.

[21] Appl. No.: 687,237

[22] Filed: Dec. 28, 1984

[51] Int. Cl.$^4$ ............. B62D 57/02; G21C 17/00
[52] U.S. Cl. .................... 180/8.1; 15/1.7; 114/222; 376/249; 414/752
[58] Field of Search ............ 180/7.1, 8.1, 8.5, 8.6, 180/8.4; 15/1.7; 114/222; 376/249, 260; 414/744 R, 744 C, 749, 752; 901/40

[56] References Cited

U.S. PATENT DOCUMENTS

| | | | |
|---|---|---|---|
| 1,715,745 | 6/1929 | Edmondson | 180/8.5 |
| 3,407,749 | 10/1968 | Frig | 180/7.1 X |
| 3,409,854 | 11/1968 | Swallert | 335/289 |
| 3,430,277 | 3/1969 | Ortega | 15/1.7 |
| 3,811,320 | 5/1974 | Cowell | 73/633 |
| 3,911,750 | 10/1975 | Prasher | 73/432 R |
| 3,913,452 | 10/1975 | Ward et al. | 180/8.1 |
| 3,934,731 | 1/1976 | Muller et al. | 414/749 |
| 4,205,939 | 6/1980 | Reyes | 414/728 |
| 4,205,940 | 6/1980 | Golick | 414/728 |
| 4,213,732 | 7/1980 | Cooper, Jr. | 414/728 |
| 4,216,893 | 8/1980 | Glatthorn | 228/45 |
| 4,231,419 | 11/1980 | Gugel | 165/11.2 |
| 4,247,974 | 2/1981 | Golick | 29/407 |
| 4,287,655 | 9/1981 | Gerkey et al. | 29/407 |
| 4,345,658 | 8/1982 | Danel et al. | 376/249 X |
| 4,368,644 | 1/1983 | Wentzell et al. | 376/249 X |
| 4,389,611 | 6/1983 | Pigeon et al. | 324/220 |

FOREIGN PATENT DOCUMENTS 844452 7/1981 U.S.S.R. ............. 180/8.1

Primary Examiner—John J. Love
Assistant Examiner—Charles R. Watts

[57] ABSTRACT

A vehicle and its control system is disclosed for inspecting or servicing a remote limited access location. The vehicle has a drive frame comprised of first and second opposing legs, and third and fourth opposing legs pivotable connected to the first and second legs to form a parallelogram. A drive mechanism is interconnected between the first and second legs of the parallelogram drive frame for opening and closing the drive frame. First and second attachment devices, illustratively in the form of magnets, are also attached to the first and second legs. The vehicle control system taking the form of a programmable computer in an illustrative embodiment of this invention responds to the opening and closing of the drive frame for alternatively actuating and deactuating the first and second attachment devices, whereby the vehicle is controllably driven.

26 Claims, 17 Drawing Figures

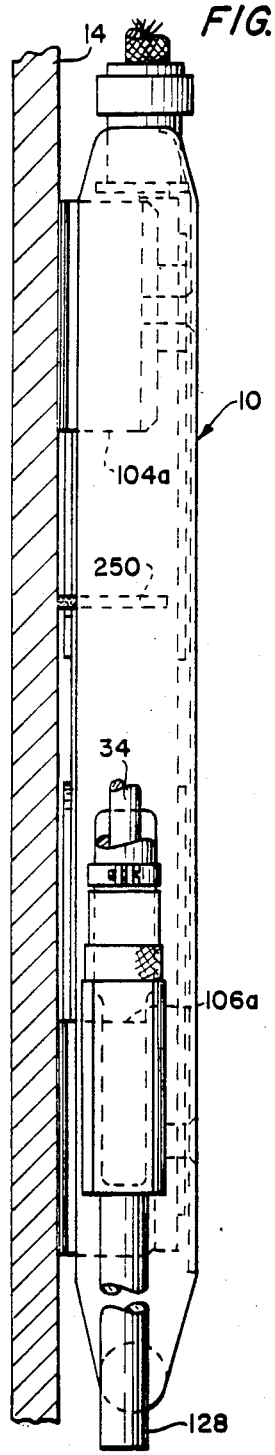
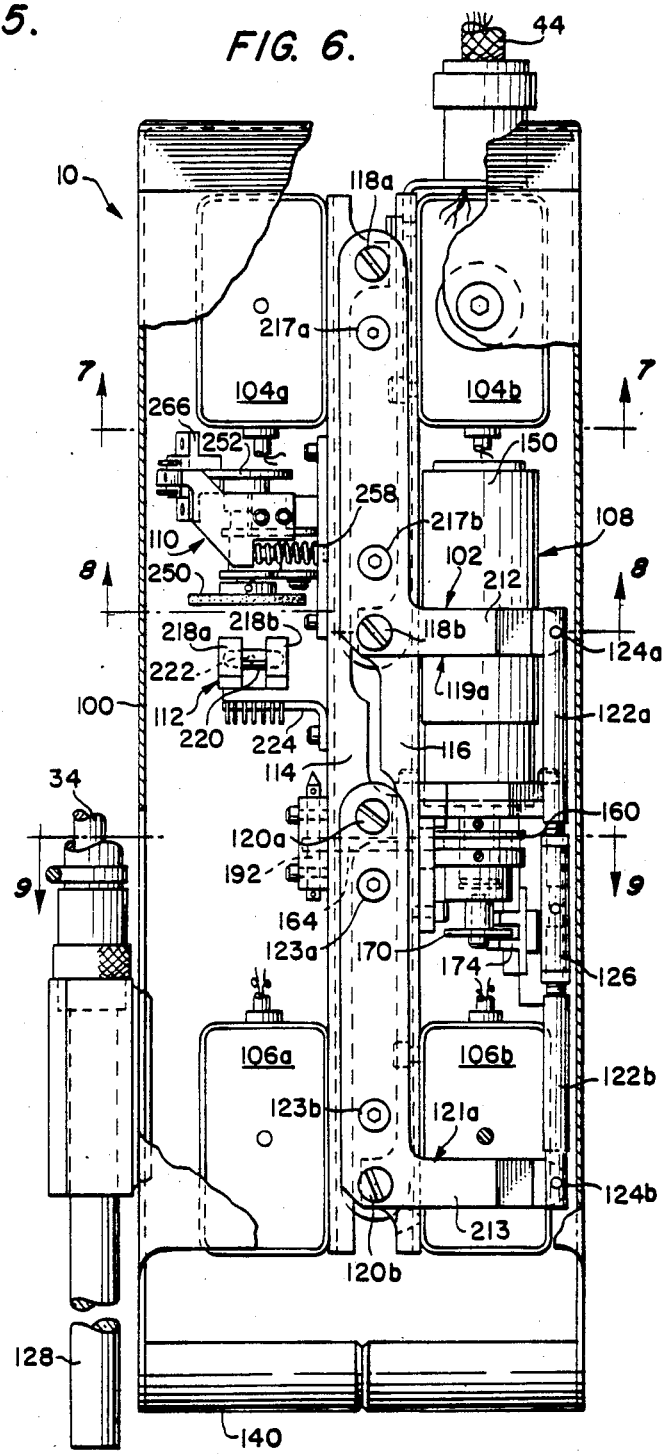
FIG. 5.
FIG. 6.

FIG. 12A.
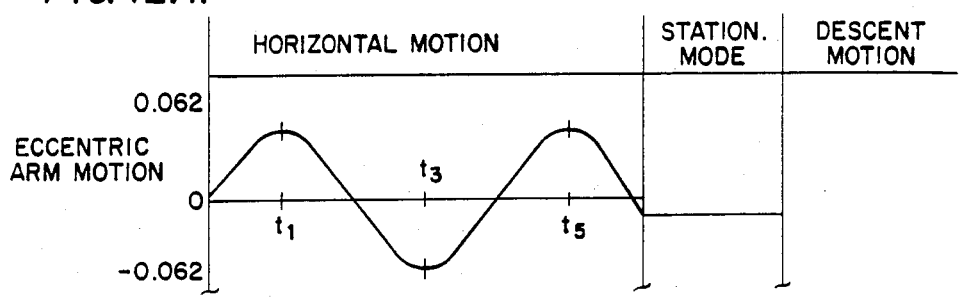
FIG. 12B.
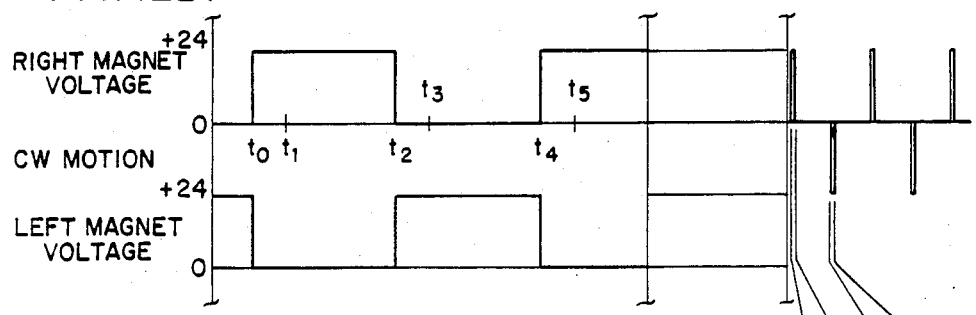
FIG. 12C.
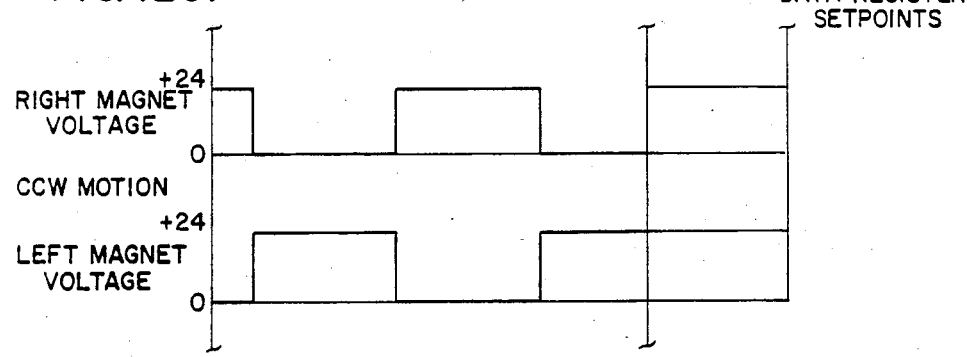
FIG. 12D.
| CONTROL RELAY STATUS | | | | | | | |
|---|---|---|---|---|---|---|---|
| 1 | 0 | 1 | 1 | 0 | 0 | 1 | 1 |
| 2 | 0 | 0 | 1 | 1 | 0 | 0 | 1 |
| 3 | 1 | 0 | 0 | 1 | 1 | 0 | 0 |
| 4 | 1 | 1 | 0 | 0 | 1 | 1 | 0 |

CONTROLLABLE VEHICLE FOR INSPECTING LIMITED ACCESS AREAS

BACKGROUND OF THE INVENTION

1. Field of the Invention

This invention relates to remotely controllable vehicles adapted to service and/or inspect limited access areas such as the interior of a nuclear steam generator.

2. Description of the Prior Art

A nuclear steam generator 12 of the type found in the prior art is shown in FIG. 1 of the Attached drawings, as comprising a bundle of a large number of vertically oriented U-shaped tubes 28. The tubes 28 are disposed in a lower, cylindrically shaped shell 14 of the steam generator 12, whose bottom end is associated with a radiation confining housing or channel head 16, typically of a hemi-spherical configuration as shown in FIG. 1. The channel head 16 is divided by a partition 22 into a first half typically known as a hot leg 18, and a second half typically known as a cold leg 20. High-temperature primary water from a nuclear reactor is introduced into the steam generator 12, through a primary inlet (not shown) into the hot leg 18. The primary water passes from the hot leg into the exposed openings of the plurality of U-shaped tubes 28, flows through the tubes 28 to be introduced into the cold leg 20 and, finally, exits from the steam generator 12 through a primary outlet (not shown). Opposite ends of the U-shaped tubes 28 are mounted within a tube sheet 26 in communication with the hot leg 18 and the cold leg 20, respectively. A wrapper 24 surrounds the bundle of U-shaped tubes 28.

Inlet or secondary water is introduced into the lower shell 14 to circulate about the U-shaped tubes 28, whereby pressurized steam is produced and supplied to a steam turbine (not shown). Further, the primary water circulating through the hot leg 18 and cold leg 20 of the channel head 16 is radioactive and has therein chemical contaminents. The high temperature water/steam environment within the steam generator 12 corrodes the U-shaped tubes 28 causing the rupture and the leakage of the radioactive primary water into the lower shell 14 of the nuclear steam generator 12. In the prior art, degradation and rupture of the U-shaped tubes 28 was attributed to either microscopic attack from chemical contaminents in the primary water or mechanical deformation. More recently, investigation of nuclear steam generators has indicated the presence of relatively large foreign objects such as hand tools, "C" clamps and steel blocks to be the cause of peripheral tube damage in the secondary side of nuclear steam generators. To prevent or minimize damage from such foreign objects as contaminents, routine inspections of the primary side including the tube sheet 26 and the secondary side including the peripheral surfaces of the U-shaped tubes 28 are carried out.

Inspection of the channel head 16 exposes personnel to significant radioactivity. Devices are known in the prior art that are insertable within the channel head 16 to permit inspection of the ends of the tubes 28 and the tube sheet 26, whereby exposure to personnel to radiation may be reduced. U.S. Pat. No. 4,287,655 of Gerkey et al., assigned to the assignee of this invention, discloses a machine for servicing the tube sheet 26 of the nuclear steam generator 12. The Gerkey et al. machine includes an arm pivoted to move in a plane parallel to and underneath the semicircular hole array in one-half of the tube sheet. A carriage mounted for reciprocal movement along the arm is provided with a platform which can be raised toward the tube sheet. In order to carry out selected operations on the tube sheet, various end effectors may be mounted on the platform. Due to the constraints imposed by the shape of the channel head, it is necessary that the end effectors by mounted on cantilevered arms and that the cantilevered arms be mounted at different angles on the platform in order to reach all of the holes in the array with the different end effectors. In some instances, cantilevered arms of more than one length are required for one type of end effectors in order that the desired operations can be performed at each of the holes in the array. The alignment of the end effectors causes sensor elements associated with the cantilevered arms to generate signals indicative of the position of the aligned tube holes in the channel head 16, whereby various servicing operations, e.g., drilling, may be carried out upon that tube within the aligned hole.

The following patents relate to apparatus similar to that disclosed in the Gerkey U.S. Pat. No. 4,287,655 and are, likewise, assigned to the assignee of this invention: U.S. Pat. No. 4,205,939 of Reyes; U.S. Pat. No. 4,205,940 of Golick; U.S. Pat. No. 4,216,893 of Glatthorn; U.S. Pat. No. 4,213,732 of Cooper, Jr.; and U.S. Pat. No. 4,247,974 of Golick.

U.S. Pat. No. 3,811,320 of Cowell describes apparatus controllably moved through such limited access areas as a tank or the like. The Cowell apparatus includes a vertically disposed cross-member having a track to be reciprocally driven by a motor, and a horizontally disposed cross-member likewise having a track reciprocally driven by a second motor. Each of the first and second cross-members have a pair of electromagnets for releasably attaching its cross-members to the wall of the tank. Each cross-member rides on the track of the other cross-member, so that as one cross-member is attached by its pair of electromagnets to the wall, the other cross-member is driven by its motor to the next position. Movement is achieved by first energizing the magnets of the vertically disposed cross-member and, then, driving the horizontally disposed cross-member in a horizontal direction. Thereafter, the pair of magnets of the horizontally disposed cross-member is energized and those of the vertically disposed cross-member deenergized, whereby the vertically disposed member may be moved to a different position. The apparatus may be moved in a vertical direction by reciprocally energizing the first motor and selectively energizing and deenergizing the magnets on the first and second cross-members. If both of these motors are energized while one cross beam member is locked in position by its pair of electromagnets, than the apparatus may be driven in a 45° direction with respect to its cross-members. Movement of this device is stated to the controlled by computer, but the details of such control are not disclosed. Further, no means are disclosed, whereby the exact position of the servicing or sensing apparatus is ascertained.

SUMMARY OF THE INVENTION

It is therefore an object of this invention to provide apparatus controllably directed to a known location with a high degree of precision;

It is a further object of this invention to provide new and improved apparatus, whose movements may be controlled in incremental steps;

It is a still further object of this invention to provide new and improved apparatus, whose movement is controlled in incremental steps to a known position with a high degree of precision.

In accordance with these and other objects of this invention, there is disclosed a vehicle, which is controllably moved along a surface as may, illustratively, be required for inspecting or servicing a remote, limited access location. The vehicle has a drive frame comprised of first and second opposing legs, and third and fourth opposing legs pivotably connected to the first and second legs to form a parallelogram. A drive mechanism is interconnected between the first and second legs of the parallelogram drive frame for opening and closing the drive frame. First and second attachment devices, illustratively in the form of magnets, are also attached to the first and second legs. A vehicle control system taking the form of a programmable computer in an illustrative embodiment of this invention responds to the opening and closing of the drive frame for alternatively actuating and deactuating the first and second attachment devices, whereby the vehicle is driven along the surface.

In a further aspect of this invention, the vehicle control system actuates the first attachment device and deactuates the second attachment device upon the closing of the drive frame to move the vehicle in a first direction, while actuating the second attachment device and deactuating the first attachment device upon the opening of the drive frame to move the vehicle in a second, different direction.

In a still further object of this invention, the drive mechanism comprises an electrically energizable motor mounted on the first leg for rotatably driving an eccentric. A drive arm is driven by the eccentric and its driven end is coupled to the second opposing leg, whereby the drive frame is opened and closed. An indicating disk with openings therein is attached to the eccentric and an optical switch means senses the openings to provide a train of signals. The vehicle control system senses the train of signals to determine the relative position of the drive arm and the drive frame and to selectively actuate the attachment devices to drive the vehicle across the surface.

In a still further aspect of this invention, the drive frame includes a pair of magnets disposed on each of the opposing first and second legs, and the vehicle control system includes a tilt sensor that provides a first signal indicative of a counter clockwise tilt with respect to vertical and a second signal indicative of a clockwise tilt. The vehicle control system is responsive to the first and second tilt indicating signals to deenergize one of the pair of magnets disposed on the trailing let, considering the direction of vehicle movement, dependent on the direction of tilt, i.e., clockwise or counter clockwise.

BRIEF DESCRIPTION OF THE DRAWINGS

While the specification concludes with claims particularly pointing out and distinctly claiming the subject matter of the invention, it is believed that the invention would be better understood from the following description taken in conjunction with the accompanied drawings, wherein:

FIG. 5 is a side view of the electromagnetic crawler as shown in FIG. 1 and the manner of its mounting upon the shell of the nuclear steam generator;

FIG. 6 is a plan view, partially broken away, of the electromagnetic crawler shown in FIGS. 1 and 5;

FIGS. 12A, B, C and D are diagrams illustrating respectively the movement of the eccentric drive arm, the timing of energizing and deenergizing the electromagnets to drive the vehicle in a clockwise direction and a counter clockwise direction and the logic states used to determine the position of the eccentric drive arm and, thus, the timing of energization/deenergization of the electromagnets.

DESCRIPTION OF THE PREFERRED EMBODIMENT

Figure 1:
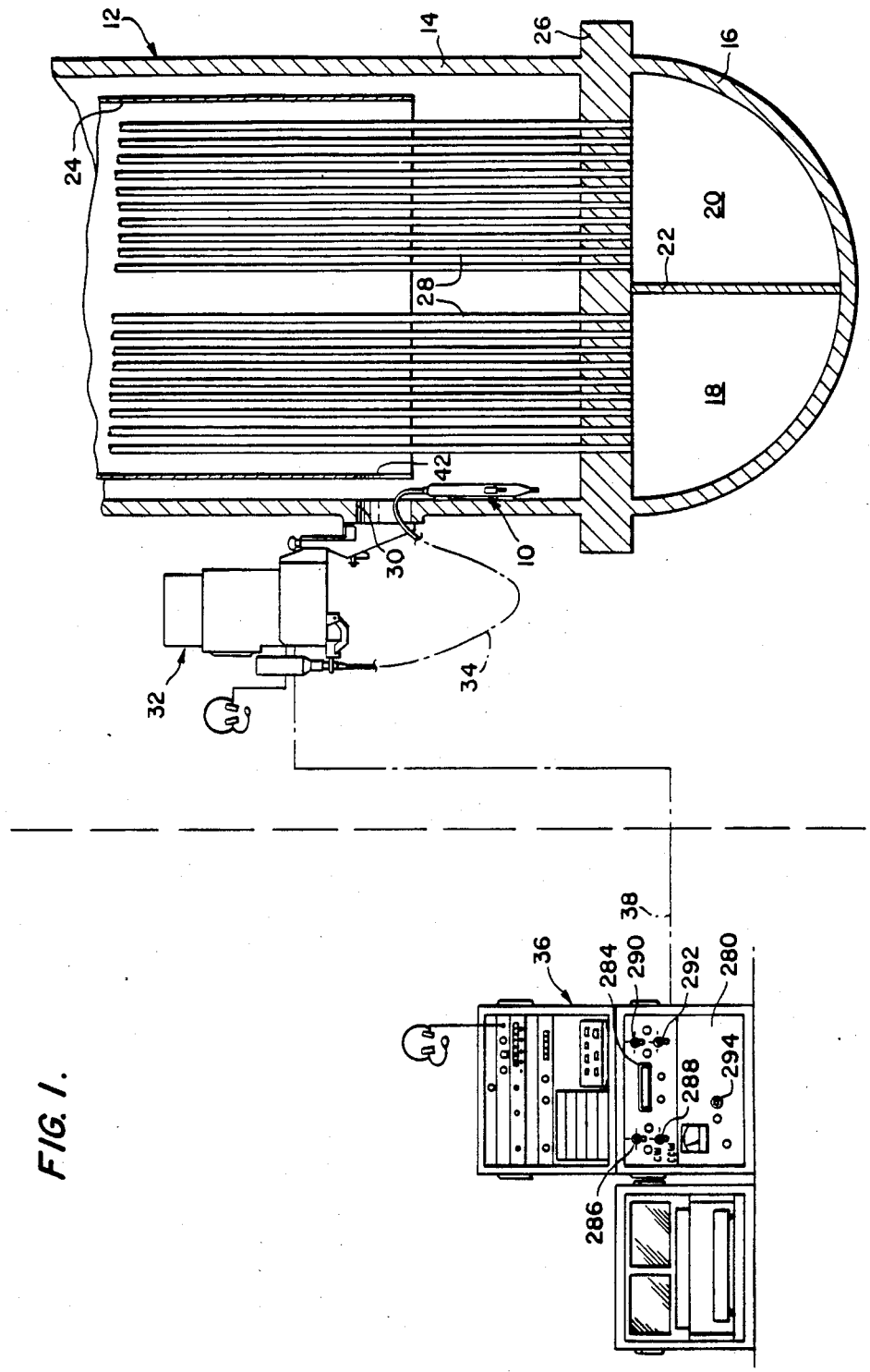
FIG. 1 is a sectioned view of a nuclear steam generator, an electromagnetic crawler in accordance with the teachings of this invention disposed within the nuclear steam generator, a hand hole station disposed at a hand hole of the nuclear stem generator, and a control and recording station disposed remotely of the steam generator, whereby the movement of the electromagnetic crawler about the generator may be controlled and data indicative of the generator recorded.
Figure 2:
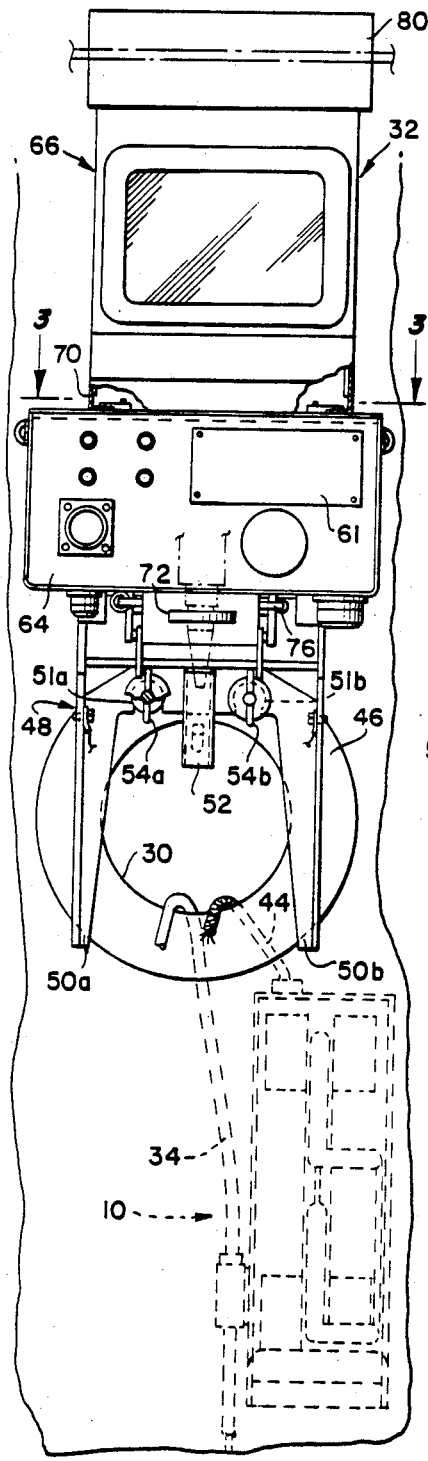
FIGS. 2 and 4 are respectively a front and a side view of the hand hole station and the manner of its mounting with respect to the hand hole of the nuclear steam generator.

Referring now to the drawings and in particular to FIG. 1, there is shown an electromagnetic crawler 10 in accordance with the teachings of this invention and the manner in which it is disposed upon the inner, peripherial surface of the shell 14 of the nuclear steam generator 12. As will be explained, the electromagnetic crawler 10 is designed to be controllably directed about the shell 14, whereby data concerning the condition of the U-shaped tubes 28 may be gathered and stored at a remotely disposed control and recording station 36. As suggested in FIG. 1, the control and recording station 36 is coupled by an interconnecting bus 38 with a hand hole station 32 that is disposed at the hand hole 30 of the nuclear steam generator 12. In turn, the hand hole station 32 is coupled by a fiber conduit 34 and a power-/logic cable 44, as shown in FIG. 2, to the electromagnetic crawler 10. As will be described in detail below, a computer implemented control system is employed within the control and recording station 36 to actuate the electromagnetic crawler 10 in a sequence of controlled incremental movements about the inner periphery of the shell 14. A command in terms of a count is entered into this computer, whereby the electromagnetic crawler 10 may be directed to a defined location with respect to the hand hole 30. Illustratively, each unit of the count corresponds to an incremental movement of the electromagnetic crawler 10.

Figure 3:
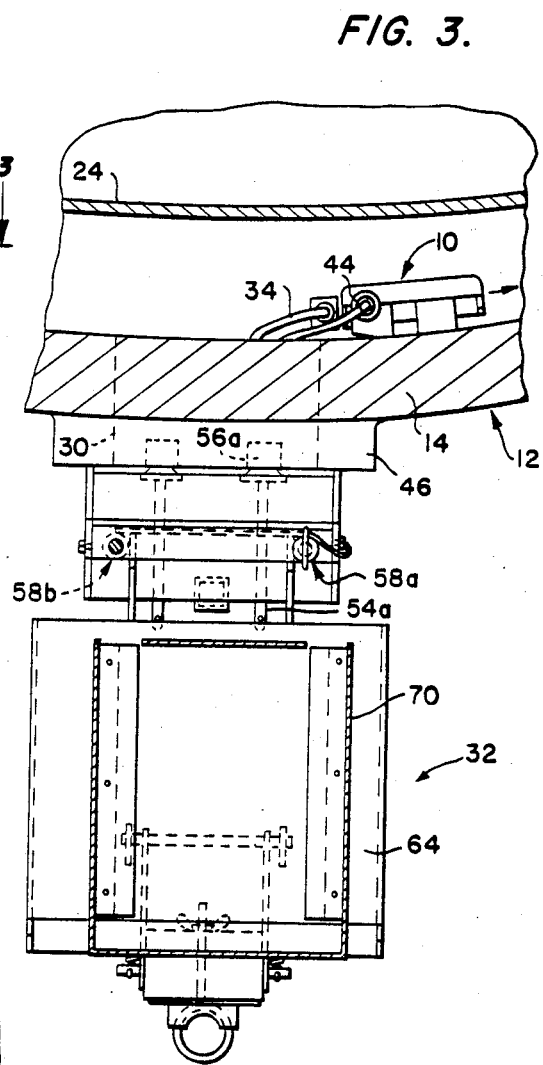
FIG. 3 is a sectioned view of the hand hole station and the nuclear steam generator as taken through line 3—3 of FIG. 2.
Figure 4:
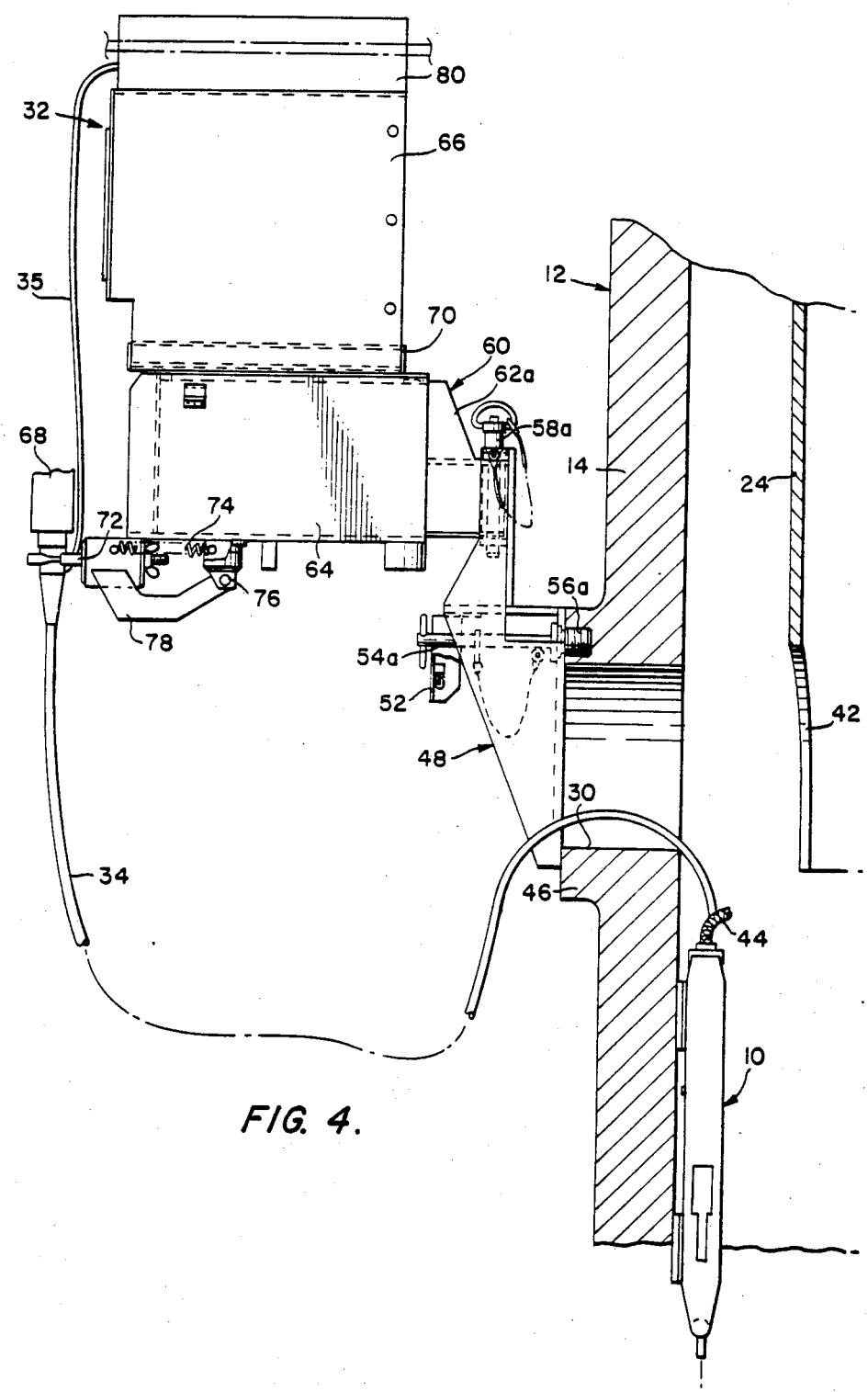

Referring now to FIGS. 2, 3, and 4, there is shown the manner in which the hand hole station 32 is mounted with respect to the hand hole 30 of the nuclear steam generator 12. In typical steam generators, a tubular passageway (not shown) leads from the hand hole 30 through an opening with the lower shell 14 to communicate with an opening 42 within the wrapper 24. Such a tubular passage, if present, is removed before an operator opens the hand hole cover (not shown) and inserts manually the electromagnetic crawler 10, whereby it may be secured to the inner peripheral surface of the shell 14, as will be explained.

The hand hole 30 has an annularly shaped raised, fixture 46, upon which is mounted a support bracket 48 as particularly illustrated in FIGS. 2 and 4. The support bracket 48 includes a pair of arms 50a and 50b spaced to be disposed about the hand hole 30, and a pair of quick release bolts 54a and 54b disposable through openings 51a and 51b of the support bracket 48, thereby retaining the bracket 48 upon the raised fixture 46. The threaded ends of the bolts 54 are screwed into threaded inserts 56a and 56b, as disposed within the raised fixture 46, as best seen in FIG. 4. Further, a lamp assembly 52 is mounted upon the support bracket 48 to provide illumination of the hand hole 30 to permit insertion of the electromagnetic crawler 10 into the nuclear steam generator 12.

Referring now to FIG. 4, the support bracket 48 is adapted to releasably receive a mounting assembly 60 comprised of a bracket 62. The bracket 62 is attached to the support bracket 48 by two quick release pins 58a and 58b. By removing one of the pins 58, the mounting assembly 60 may be pivoted away from the hand hole 30 to permit installation of the electromagnetic crawler 10. The mounting assembly 60 is fixably attached to an enclosure 64 in which is mounted an intercom 61 for communicating with the remote control and recording station 36, a DC power supply for a TV camera 68 and DC a power source for the lamp assembly 52. As shown in FIG. 4, the TV camera 68 is optically coupled to the fiberscope 34, which has a manual focus control and 4-way articulation of its distal tip as mounted upon the electromagnetic crawler 10. In this fashion, the distal tip may be orientated by the operator to view the selected U-shaped tubes 28 and the received image focused upon the TV camera 68. As shown in FIGS. 2 and 4, a CRT monitor 66 is mounted by a support frame 70 upon the enclosure 64. In turn, a fiberscope light supply 80 is mounted upon the CRT monitor 66. The fiberscope light supply 80 directs high intensity light via a fiber glass conduit 35 to the fiberscope 34. Approximately one-half of the fiber glass tubes of the fiberscope 34 transmits the high intensity light to its distal tip to thereby illuminate the interior of the nuclear steam generator 12. The other half of the fiber glass tubes transmits the image focused onto the distal tip of the fiberscope 34 to the TV camera 68. The CRT monitor 66 permits the operator to manually focus and position the distal tip of the fiberscope 34. The fiberscope 34 is attached to a saddle clamp 78, pivotably disposed about a pivot shaft 76 and biased by a spring 74 to the position shown in FIG. 4. The TV camera 68 is secured by a bolt assembly 72 to the saddle clamp 78. The saddle clamp 78 may rotate counter clockwise as seen in FIG. 4 to permit the TV camera 68 to be repositioned away from the front of the enclosure 64 to facilitate installation of the electromagnetic crawler 10 and to give access to the front of the enclosure 64.

Referring now to FIGS. 5 and 6, the structure of the electromagnetic crawler 10 is more fully shown. In an illustrative embodiment of this invention, the electromagnetic crawler 10 is configured and dimensioned to fit through the hand hole 30 of the nuclear steam generator 12; the hand hole 30 illustratively has a 6 inch diameter. The electromagnetic crawler 10 is adapted to carry the distal tip of the fiberscope 34 so that it may be selectively positioned about the inner periphery of the shell 14 to view the U-shaped tubes 28. The electromagnetic crawler 10 includes a cover 100, broken away in FIG. 6 to show a parallelogram drive frame 102. The parallelogram drive frame 102 comprises a right channel 114 and a left channel 116, which are disposed parallel of each other and are interconnected by a pair of upper links 119a and 119b, and a pair of lower links 121a and 121b. The upper links 119a and 119b are connected by a screw 118a at their upper portions as shown in FIG. 6 to an upper portion of the channel 114 to permit rotation of the upper links 119a and 119b with respect to the channel 114. The upper links 119a and 119b are connected at their lower ends by a screw 118b to the channel 116 in a manner to permit pivoting of the links 119a and 119b with respect to the channel 116. In a similar fashion, the lower links 121a and 121b are pivotably connected at their upper end by a screw 120a to the channel 114 and by a screw 120b to a lower portion of the channel 116.

Figure 9:
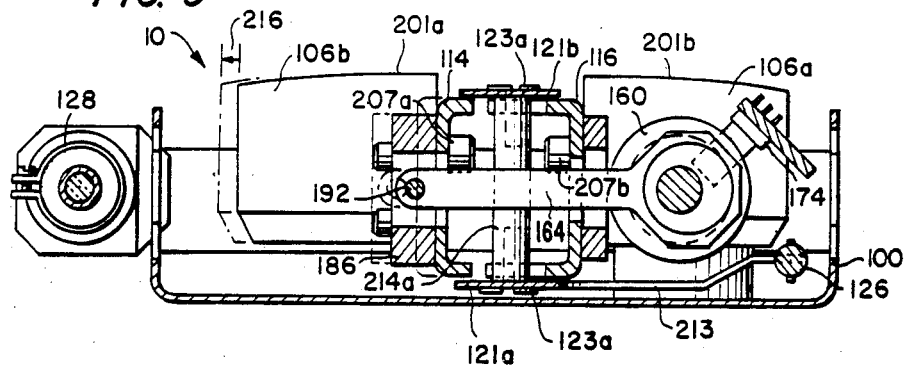

The eccentric drive assembly 108, as will be described in detail below, functions to separate the channels 114 and 116 in cyclical fashion, whereby the electromagnetic crawler 10 may move about the inner periphery of the shell 14. FIG. 6 illustrates the channel members 114 and 116 in their closed position; FIG. 9 shows the channels 114 and 116 in their closed position in full line, and the channels 116 and 114 in their open position in dotted line. The eccentric drive assembly 108 effects the opening and closing of the channel members 114 and 116, while the upper and lower links 119 and 121 permit the desired pivoting.

The eccentric drive assembly 108 includes a motor 150 for rotatably driving an eccentric member 160, for driving repetitively a drive arm 164 in a rectilinear fashion to open and close the channels 114 and 116 of the parallelogram drive frame 102. As illustrated in FIG. 6, the eccentric drive motor 150 is mounted upon the channel 116 and rotatably drives the drive arm 164 whose distal tip is coupled by a coupling pin 192 to the channel 114.

As best shown in FIG. 6, an upper left magnet 104a and a lower left magnet 106a are fixedly mounted upon the channel 114 of the electromagnetic crawler 10, and an upper right magnet 104b and a lower right magnet 106b are fixedly mounted upon the channel 116. Movement of the electromagnetic crawler 10 in a horizontal direction, as shown in FIG. 6, is accomplished by energizing and deenergizing alternatively the pairs of electromagnets mounted on the channel 114 and 116 of the parallelogram drive frame 102. The channels 114 and 116 of the parallelogram drive frame 102 are opened and closed by the eccentric drive motor 150. Power and logic control for the energization and deenergization of the electromagnets 104 and 106, as well as the eccentric drive motor 150, is provided by the control and recording station 36 as applied through the power/logic cable 44 to the electromagnetic crawler 10.

As further shown in FIG. 6, the electromagnetic crawler 10 includes an azimuth position sensor 110 comprised generally of a roller hub 250 biased by a spring 258 against the inner periphery of the shell 14 to rotate as the crawler 10 moves there along, whereby a gauge wheel 252 is rotated past an optical switch 266, which outputs a series of electrical signals each indicative of a unit of crawler movement. A tilt sensor 112 is mounted by a bracket 224 upon the channel 114 to provide a signal from one of a pair of optical switches 218a and 218b depending upon whether the electromagnetic crawler 10 has tilted clockwise or counter-clockwise, as seen in FIG. 6.

The parallelogram drive frame 102 includes a mechanism for adjusting the relative position of the channels 114 and 116 to bias the electromagnetic crawler 10 to move in a slightly upward or downward direction or to correct for the asymmetric structure of the parallelogram drive frame 102 for movement in a horizontal direction, as desired. As best seen in FIG. 6, the upper link 119a includes an arm 212 extending to the right and coupled at its end by a roll pin 124a to an upper rod 122a. In a similar fashion, the lower link 121a includes an arm 213 extending to the right and coupled at its end by a roll pin 124b to a lower rod 122a. A coupler 126 is threadably secured to the ends of each of the upper and lower rods 122a and b and may be adjustably rotated to move the arms 212 and 213 together or apart, whereby the relative positions of the channels 114 and 116 and, thus, the direction of the electromagnetic crawler 10 may be selectively adjusted.

Figure 10:
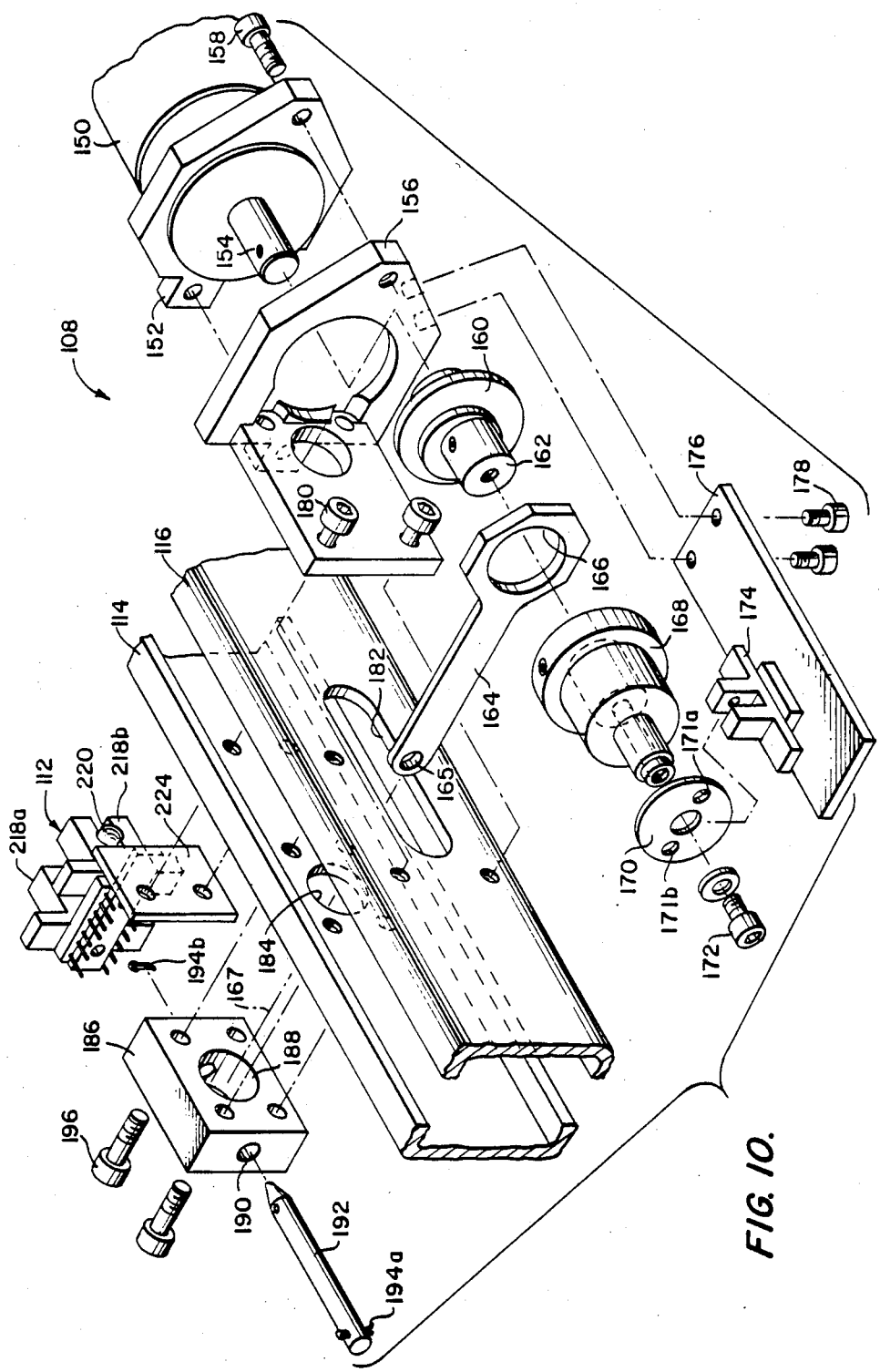
FIG. 10 is a perspective view of the eccentric drive assembly and its manner of connection to drive the parallelogram drive frame of the electromagnetic crawler of this invention.

Referring now to FIG. 10, the eccentric drive assembly 108 will be more fully described. The eccentric drive motor 150 is fixably attached to the channel 116. In particular, the eccentric drive motor 150 is secured to a mounting plate 152, which is in turn attached by screws 158 to an L-shaped bracket 156. In turn, the L-shaped bracket 156 is secured by screws 180 to the channel 116. The eccentric drive motor 150 rotates its drive shaft 154, which is affixed to the eccentric 160 by a roll pin. The eccentric 160 includes a coupling post offset from the axis of the drive shaft 154. The coupling post 162 is inserted with an opening 166 of a drive arm 164 and, further, is affixedly coupled to a hub 168. The coupling post 162 is free to rotate within the opening 166, whereby the drive arm 164 is driven rectilinearly, as the drive shaft 154 and the eccentric 160 are rotatably driven by the eccentric motor 150. The distal end of the drive arm 164 is attached to drive the channel 114. In particular, an opening 165 is disposed within the distal end of the drive arm 164 for receiving the coupling pin 192. As illustrated in FIG. 10, the drive arm 164 is inserted through openings 182 and 184 of the channels 116 and 114, respectively, and into the opening 188 of a coupling block 186. The coupling clock 186 is affixed by screws 196 to the channel 114. The coupling pin 192 is disposed within opening 190 of the coupling block 186 and through the opening 165 of the drive arm 164, and is secured to the coupling block 186 by a pair of cotter pins 194a and 194b.

An indicator wheel 170 is affixedly attached by a screw 172 to the hub 168. The indicator wheel 170 has a pair of openings 171a and 171b disposed 180° apart. As the eccentric drive motor 150 imparts a rotational motion to its drive shaft 154, the indicator wheel 170 rotates the openings 170a and 170b past optical switch 174, which outputs a pair of signals per revolution of the indicator wheel 170. The optical switch 174 is affixedly mounted on a bracket 176, which is attached, in turn, by screws 178 to the L-shaped bracket 156. As will be explained below with respect to FIG. 12, the diameter passing through the openings 171a and 171b is oriented with respect to the offset axis of the eccentric 160, whereby the occurrence of the output signals of the optical switch 174 positively identify the position of the drive arm 164 and, thus, the relative position of the channels 114 and 116. As will be further explained, these output signals are used to control the timing of the energization/deenergization of the pairs of magnets 104a and 106a, and magnets 104b and 106b.

Figure 11:
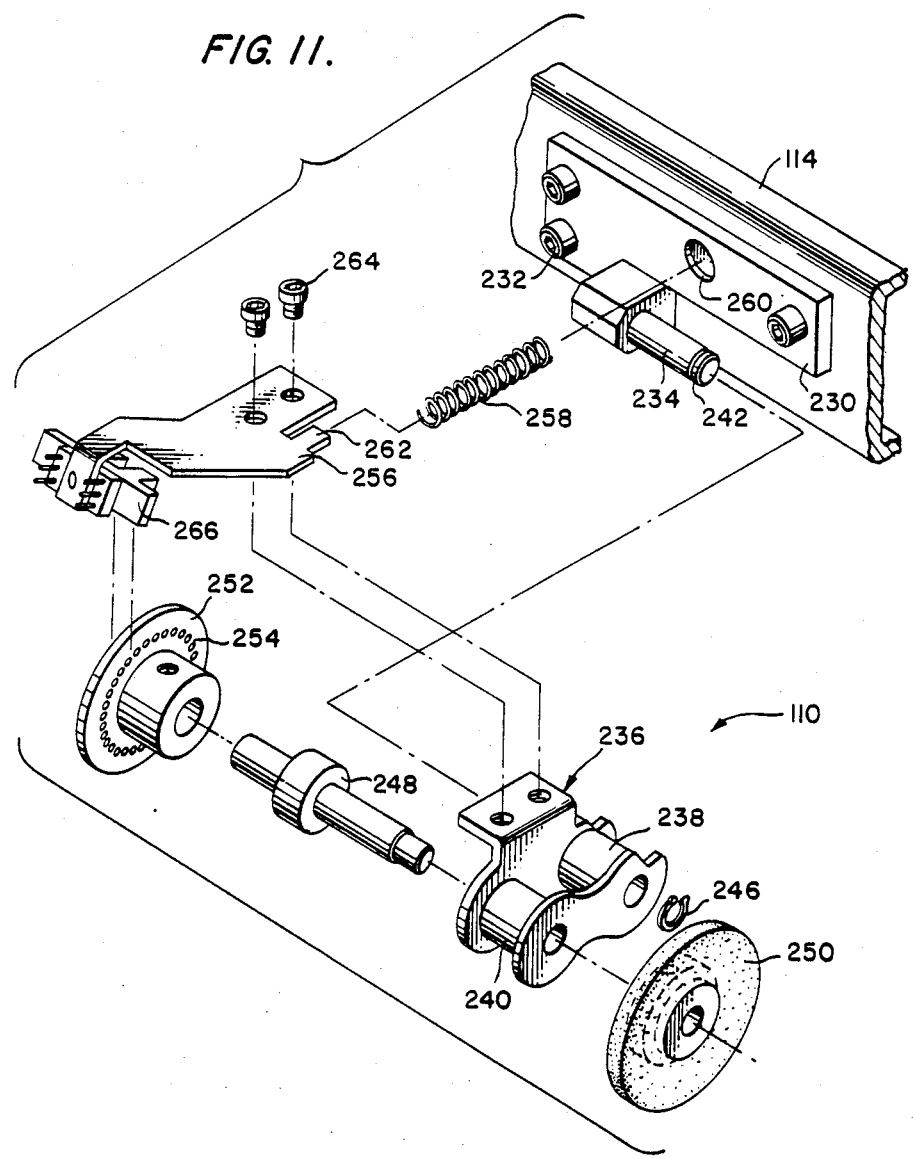
FIG. 11 is a perspective view of the azimuth position sensor mounted within the magnetic crawler of this invention for determining the azimuth position thereof.

Referring now to FIG. 11, the azimuth position sensor 110 is more fully described. The azimuth position sensor 110 includes the roller hub 250, which is rotatably mounted upon one end of a rotatable shaft 248. The other end of the rotatable shaft 248 is affixedly secured to the gauge wheel 252 by a set screw. The gauge wheel 252 has a plurality of equally spaced openings 254 therethrough. In an illustrative embodiment of this invention, the gauge wheel 252 has 32 openings 254 therethrough. An optical switch 266 is mounted by a bracket 256 to sense the rotation of the openings 254 there past. The rotatable shaft 258 is rotatably mounted within a first bearing sleeve 240 of a bearing assembly 236. The bearing assembly includes a second bearing sleeve 238 that pivotably receives a pivot post 234 of a bracket 230. The bearing assembly 236 is secured upon the pivot point 234 by a retaining ring 246 clipped in a groove 240 machined in an end of the pivot post 234. The bracket 230 is affixed by screws 232 to the channel 114. One end of a spring 258 is confined within an opening 260 of the bracket 230, while the other end of the spring 258 slips over a tab 262 of the bracket 256. In turn, the bracket 256 is affixed by screws 264 to the bearing assembly 236. The spring 258, working in compression, biases the bracket 256 and, therefore, the roller hub 250 into the page of FIG. 6 and against the inner surface of the shell 14, as shown in FIGS. 5 and 8.

As best shown in FIGS. 5 and 6, the electromagnetic crawler 10 is mounted vertically with respect to the shell 14 such that the axis of its roller hub 250 is likewise disposed vertically. Thus, as the electromagnetic crawler 10 moves horizontally about the inner peripheral surface of the shell 14, the roller hub 250 rotatably drives the gauge wheel 252. The optical switch 266 responds to the rotation of the gauge wheel 252 and the passage of the openings 254 to generate a corresponding train of signals each indicative of 0.12 inches of azimuthal or horizontal movement of the electromagnetic crawler 10 about the inner peripheral surface of the shell 14.

Referring now to FIGS. 6 and 10, the tilt sensor 112 will be more fully described. The tilt sensor 110 includes a sensor tube 220, which contains a ball 222 made of an opaque material such as steel and configured and dimensioned to freely roll within the sensor tube 220. As best seen in FIG. 6, an optical switch 218a is disposed at one end of the sensor tube 220 to sense the presence of the ball 222 as it would roll to that position and, similarly, a second optical switch 218b is disposed at the other end. The optical switches 218a and 218b are mounted on a bracket 224, which is affixed by screws to the channel 114. In an illustrative embodiment of this invention, the sensor tube 220 is mounted as shown in FIG. 6 to lie in a horizontal or azimuthal plane with respect to the shell 14. If the electromagnetic crawler 10 and, thus, the sensor tube 220 is tilted clockwise or counter-clockwise a minimum angle of 2° with respect to vertical as seen in FIGS. 5 and 6, the ball 222 will roll to one end of the sensor tube 220 interrupting the path of one of the optical switches 218a or 218b, which provides a corresponding signal to the programmable controller.

Figure 7:
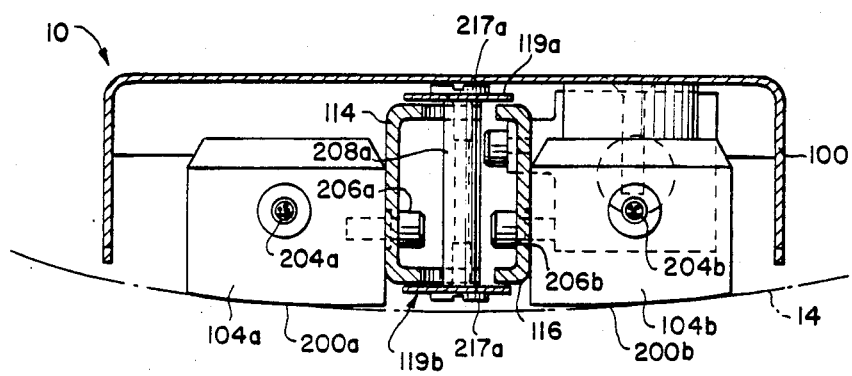
FIGS. 7, 8 and 9 are respectively sectioned views as taken along lines 7—7, 8—8, and 8—9 of FIG. 6.
Figure 8:
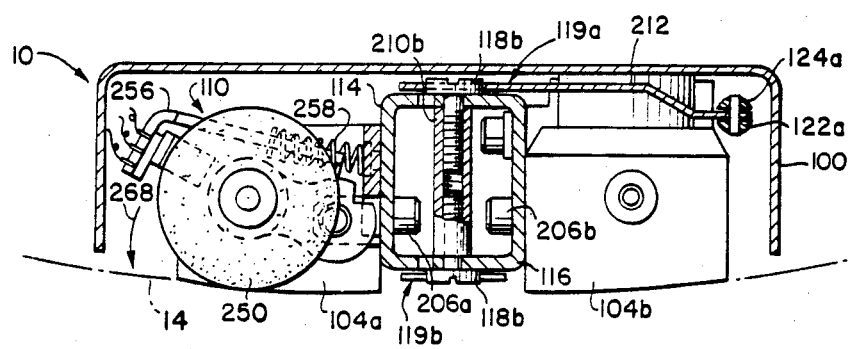

The construction of the parallelogram drive frame 102 and its channels 114 and 116 is more fully shown in FIGS. 7, 8 and 9, as considered with FIG. 6. Two pairs of screws 118a and 118b serve to connect opposing ends of the pair of upper links 119a and 119b respectively to the channels 114 and 116. As seen in FIG. 8, the screws 118b extend through corresponding openings within the upper links 119a and 119b, and openings within the channel 116 to be threadably received by a post 210b. Though not shown in the drawings, it is understood that a similar post 210a is disposed between the upper links 119a and 119b to threadably receive the screws 118a. Additional support is provided between the upper links 119a and 119b by a pair of posts 208a, as shown in FIG. 7, and 208b (not shown), both disposed between the upper links 119a and 119b and secured thereto by two sets of screws 217a and 217b, respectively. In a similar fashion, two sets of screws 120a and 120b are inserted through openings within opposite ends of the lower links 121a and 121b to be threadably received by posts (not shown). Likewise, a further set of posts 214a and 214b (not shown) is inserted between the lower links 121a and 121b and is secured thereto by two pairs of screws 123a and 123b, respectively.

The upper and lower left magnets 104a and 106a are secured to the channel 114 by screws 206a and 207a. Similarly, the upper right and lower right magnets 104b and 106b are affixed to the channel 116 by screws 206b and 207b. As particularly shown in FIGS. 7, 8 and 9, the surfaces 200a and 200b of the upper left and right magnets 104a and 104b, and the surfaces 201a and 201b of the lower left and right magnets 106a and 106b are curved in accordance with the cylindrical configuration of the shell 14, whereby the magnets may be effectively secured thereto.

A brief overview of the operation of the electromagnetic crawler 10 will now be given. The electromagnetic crawler 10 is capable of moving in a horizontal or azimuthal direction along the inner surface of the shell 14 in either a clockwise or counter clockwise direction taking the hand hole 230 as a point of initial reference and viewing the nuclear steam generator 12 from the top as seen in FIG. 1. Crawler movement is accomplished by the eccentric drive motor 150, which on command is energized to rotatably drive its drive shaft 154 and the eccentric 160 connected thereto, whereby the drive arm 164 is reciprocally driven in a rectilinearly fashion between that frame closed position shown in full line and that frame open position shown in dotted line in FIG. 9. The eccentric drive motor 150 is affixed to one channel 116, whereas the other end of the drive arm 164 is coupled to the other channel 114. In an illustrative embodiment of this invention, the drive arm 150 is moved from its position shown in full line to that position as shown in dotted line, traveling a distance of 0.125 inches.

Figure 13A:
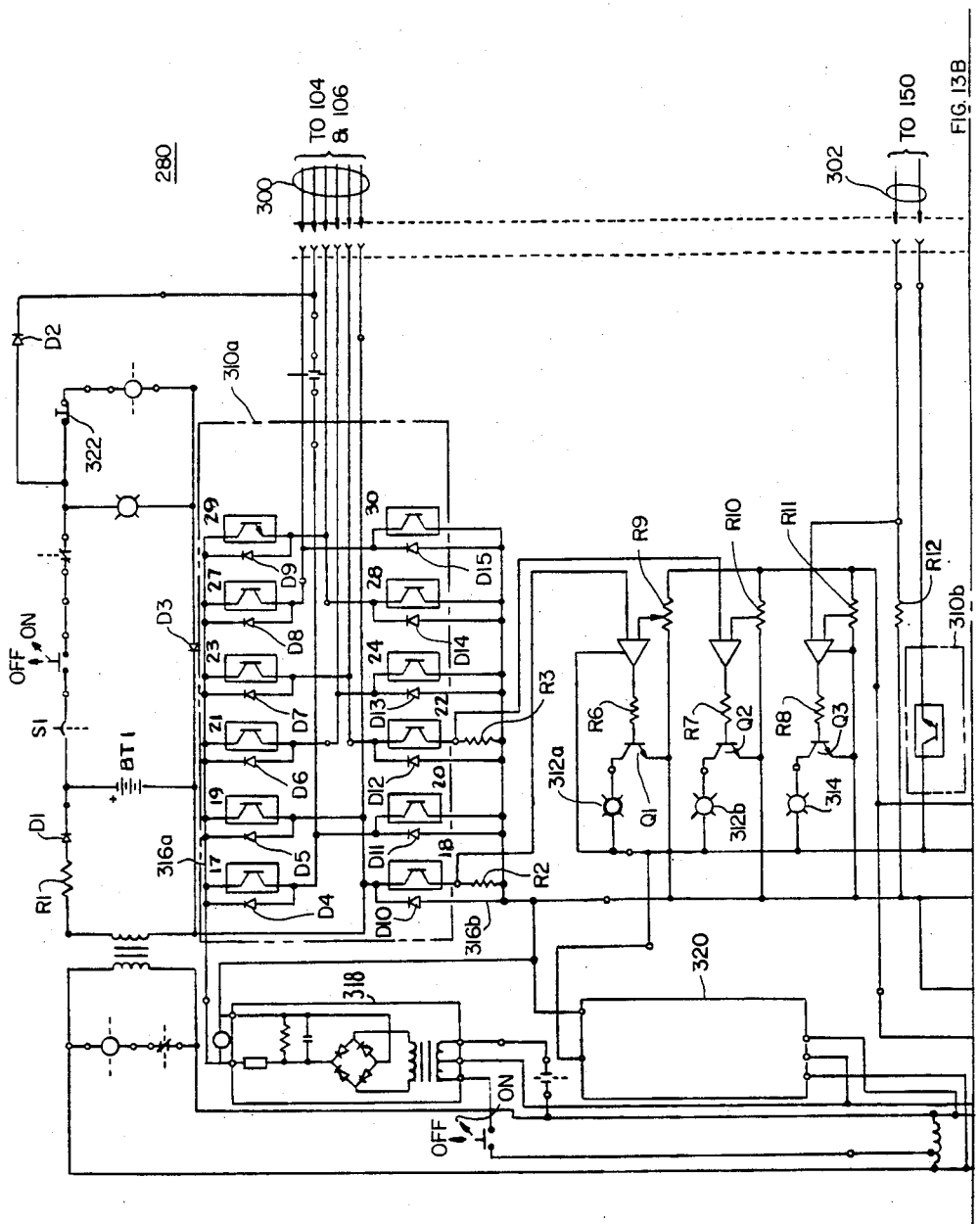
FIGS. 13A and B are a schematic diagram of the programmable controller that controls vehicle movement and, in particular, the interface circuit between the microprocessor and the various sensors, the eccentric drive motor and the electromagnets of the vehicle.

A programmable controller 280, as shown generally in FIG. 1 and in detail by FIGS. 13A and B, alternatively energizes the left upper and lower magnets 104a and 106a, and the right upper and lower magnets 104b and 106b. When a crawler direction switch 288 is thrown to its clockwise (CW) position 288b, the magnets 104 and 106 are energized as shown in FIG. 12B. In particular, at time t0, the right upper and lower magnets 104b and 106b are energized, whereas the left upper and lower magnets 104a and 106a are deenergized. At time t1, the drive arm 164 is disposed in that position shown in dotted line in FIG. 9 and from time t1 to time t3 moves to the right to that position shown in full line in FIG. 9, whereby the channel 114 is moved to the right as seen in FIG. 9. At t2, the left upper lower magnets 104a and 106a are energized and the right upper and lower magnets 104a and 106a are deenergized. The deenergization and energization of the magnets is done at a time slightly in advance of that time that the drive arm 164 reaches a limit of its travel and reverses direction in order to permit the magnetic field to sufficiently decay in the deenergized magnets and, conversely, the magnetic field to build-up sufficiently to release and to attach the magnets to the inner surface of the shell 14. From time t3 to t5 as seen in FIGS. 12A and B, the drive arm 164 is driven by the eccentric drive motor 150 and its eccentric 160 to the right as seen in FIG. 9, whereby the channel 116 and, thus, the electromagnetic crawler 10 is moved to the right as shown in FIG. 9 and clockwise about the inner peripheral surface of the shell 14 as viewed from the top of the nuclear steam generator 12.

The signals for controlling the energization and deenergization of the magnets 104 and 106 are provided by the optical switch 174 in response to the rotation of the indicator wheel 170 and its openings 171a and 171b there past. The relative position of the indicator wheel 170 to the eccentric 160 is adjusted to provide the desired timing of energization/deenergization slightly in advance of the reversal of direction of the drive arm 164. In a similar fashion, when the crawler direction switch 288 is set to its counter clockwise position (CCW) 288a, the programmable controller 280 responds to the signals generated by the optical switch 174 to energize and deenergize the magnets 104 and 106 in a manner shown in FIG. 12C, whereby the electromagnetic crawler 10 is directed in a counter clockwise direction about the inner peripheral surface of the shell 14. The logic for evaluating the signals derived from the optical switch 174 is generally illustrated in FIG. 12D and will be explained below in terms of that program executed by the computer of the programmable controller 280.

As suggested in FIGS. 12B and 12C, each of the magnets 104 and 106 is energized continuously to maintain the electromagnetic crawler 10 in a stationary position, while deenergizing the eccentric drive motor 150. As suggested in FIG. 12B, the controlled descent of the electromagnetic crawler 10 is accomplished by reversing the polarity of the energizing voltage applied to the magnets 104 and 106 with a relatively long intermediate hold time at zero voltage. As will be explained in detail below, counts or set points are entered in a data register to provide a positive going energization between times t1 and t2, a relatively long off period between times t2 and t3 and an energization of opposite polarity between the times determined by the set points t3 and t4. The reversal with long off time of the magnet energizing voltages reduces the adhesion between the magnets 104 and 106 and the wrapper 24, whereby the electromagnetic crawler 10 is permitted to controllably slide or descend.

Figure 13B:
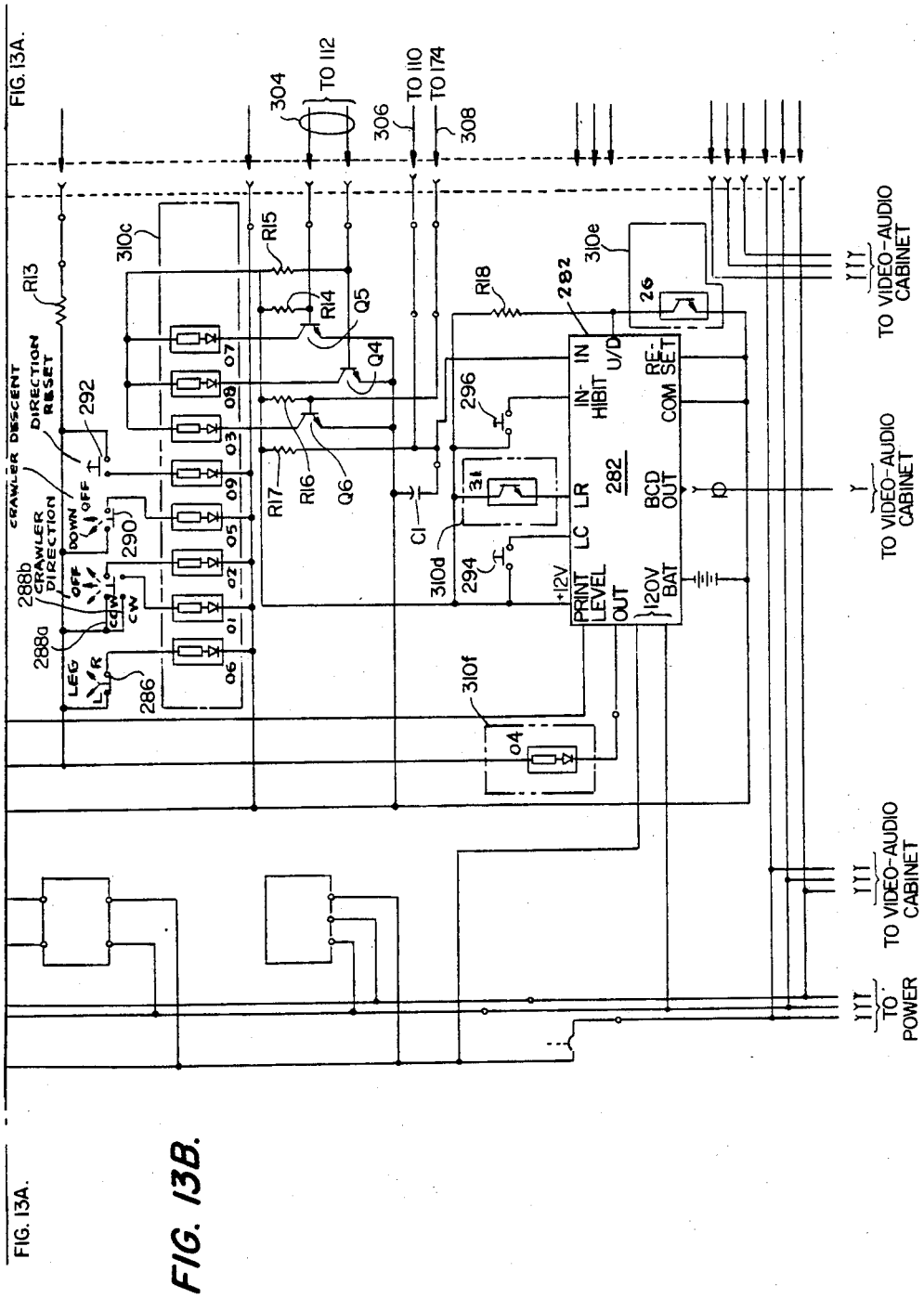

The distance travelled by the electromagnetic crawler 10 about the inner peripheral surface of the shell 14 as measured from the hand hole 30 is determined by manually entering a count in a thumb wheel switch 284 disposed upon the front plate of the programmable controller 280, as shown in FIG. 1. The set count is loaded into an up/down counter 282 upon actuating a load counter switch 294 as shown in FIGS. 1 and 13B. When the eccentric drive motor 150 is energized and the pairs of electromagnets 104a and 106a and 104b and 106b are alternatively energized and deenergized as described above, the electromagnetic crawler 10 is directed in either a clockwise or counter clockwise direction. As the electromagnetic crawler 10 traverses the surface of the shell 14, the optical switch 266 of the azimuth position sensor 110 generates a train of pulses, which are applied to increment and/or decrement the count loaded into the up/down counter 282, depending upon which direction the crawler is moving and which side of the hand hole 30 the electromagnetic crawler 10 is placed. When the count loaded into the up/down counter 282 reaches a preset value corresponding to that set into the thumb wheel switch 284, the programmable controller 280 brings the electromagnetic crawler 10 to a stop at the desired location. The azimuth position sensor 110 includes the roller hub 250 which rotates the gauge wheel 252 as the electromagnetic crawler 10 traverses the shell 14, whereby the openings 254 are rotated past the optical switch 266 to generate the train of signals. In an illustrative embodiment of this invention, each such signal is indicative of 0.125 inch of crawler movement.

If the electromagnetic crawler 10 becomes eschewed with respect to the azimuthal or horizontal direction as it moves about the inner peripheral surface of the shell 14, correction is accomplished by selectively turning off one of the magnets 104 and 106, depending upon the direction of travel and direction of tilt. The direction of tilt is indicated by which of the optical switches 218a or 218b of the tilt sensor 112 is energized. For example, if the electromagnetic crawler 10 is eschewed or tilted at least 2° clockwise as seen in FIG. 6, the steel ball 222 will actuate the optical switch 218b. Conversely, if the electromagnetic crawler 10 is tilted counter clockwise, the optical switch 218a will be energized. The leading magnet, either magnet 104 or 106, on the trailing side of the electromagnetic crawler 10, considering the direction of crawler movement, is deenergized. For example, if the electromagnetic crawler 10 is moving to the left as seen in FIG. 6 or in a counter clockwise direction and the electromagnetic crawler 10 is tilted clockwise as seen in FIG. 6, then the lower right magnetic 106b is the leading magnetic and is deenergized. In similar fashion, if the electromagnetic crawler 10 is moving in a counter clockwise direction and is tilted in a counter clockwise direction, then the upper right magnet 104b is the leading magnet and is deenergized for a predetermined interval. By deenergizing the leading magnet on the trailing side of the electromagnetic crawler 10, the electromagnetic crawler 10 tends to pivot about the energized magnet on the trailing side, thereby tending to move in a direction offset the tilt detected by the tilt sensor 11.

The details of the programmable controller 280 will now be explained with respect to FIGS. 13A and B. FIGS. 13A and B are a diagram of the input/output circuitry interfacing between a microprocessor (not shown) and the various elements of the electromagnetic crawler 10, as explained above. The microprocessor may illustratively take the form in a preferred embodiment of this invention of that microprocessor as manufactured by Eagle Signal under their designation of EPTAK-200, and is coupled by a plurality of inputs/outputs (I/O) arrays 310a, b, c, d, e and f to the elements of the electromagnetic crawler 10. In particular, the I/O array 310a functions as an interface between the microprocessor and a bus 300 coupled to the magnets 104a and b and 106a and b.

As illustrated in FIG. 13, the I/O 310a array comprises some 12 triac output circuits marked 17 to 30. Each such triac circuit is responsive to radiation emitted by a light emitting diode (LED) as directly energized by the microprocessor. Such an I/O array is manufactured by Eagle Signal Company under their designation NL-130 for inputs and NL-140 for outputs. Such an I/O array has been modified to the extent to provide a fast recovery diode coupled in parallel with each triac output circuit to provide a path to dissipate the inductive energy of the magnet, thus protecting its triac output circuits. Similarly, an I/O 310b interfaces the microprocessor with a bus 302 coupled to energize the eccentric drive motor 150. Upon energization of the triac output circuit of the I/O array 310b, an energizing voltage, illustratively plus 24 volts DC, is applied to the eccentric drive motor 150. The I/O array 310c is comprised of 8 light emitting diode (LED) circuits and serves to interconnect the left/right switch 286, the crawler direction switch 288, the crawler descent switch 290, the direction reset switch 292 and bus 304, as connected to the optical switches 218a and 218b of the tilt sensor 112, to the microprocessor. The I/O array 310d serves to couple the signals set into the thumb wheel switch 284 into the up/down counter 282 when the load counter switch 294 is closed. The I/O array 310e couples a signal from the microprocessor instructing the up/down counter 282 to count up (increment) or down (decrement) the count entered therein. The I/O array 310f is coupled to that output of the microprocessor indicative of whether the entered count has been decremented/incremented to a predetermined count and, thus, the electromagnetic crawler 10 has reached its selected destination.

A DC power supply 318 converts the line AC voltage into a regulated DC voltage, illustratively of 24 volts. The positive voltage of supply 318 is applied to a conductor 316a, whereas a similar DC power supply 320 provides a negative voltage to the conductor 316b. In case of line failure, a backup battery BT1 is inserted in circuit by a voltage sensing relay to automatically provide power to magnet 104A. It is understood that the various buses 300, 302, 304, 306 and 308 are included within the power/logic cable 44 coupled to the electromagnetic crawler 10 as shown in FIGS. 5 and 6.

In the following, the program to be executed by the microprocessors of the programmable controller 280 will be explained in detail. It is understood that the memory associated with the microprocessor has addressable areas for storing data necessary to effect the program, e.g., data registers, auxiliary registers and controlled relays, as follows:

Data Registers:
1. Magnets On (+)
2. Magnets Off
3. Magnets On (−)
4. Magnets Off
5. Reset
6. Index -continued 7. Cycle Complete
8. Actual Count
Auxiliary Registers:
1. Reset
2. Index
3. Actual Count
4. Stop Tilt Correction
5. Start Tilt Correction
Control Relays (Retentive):
1. Eccentric Switch Hole - Frame Opening
2. Eccentric Switch No-Hole - Frame Closing
3. Eccentric Switch Hole - Frame Closing
4. Eccentric Switch No-Hole - Frame Opening
5. First Scan Initialization
6. Azimuth Counter Count-Out
7. Direction Correction - One Scan
8. CCW Tilt Correction
9. CW Tilt Correction
LED Status:
0 - Off
1 - On In the course of the program description set out below, data registers are referred to as "DATA", auxiliary registers as "AUX" and control relays as "CR".

At power-up, the INITIALIZATION subroutine is executed to set the initial status of the control relays and set points in the data registers and auxiliary registers as follows:

| Initialization | | | |
|---|---|---|---|
| AUX 1 = | 0 | | |
| AUX 2 = | 1 | | |
| AUX 3 = | 182 | | |
| AUX 4 = | 700 | | |
| AUX 5 = | 100 | | |
| DATA 1 = | 0 | | |
| DATA 2 = | 10 | | |
| DATA 3 = | 11 | | |
| DATA 4 = | 20 | | |
| DATA 5 = | 0 | | |
| DATA 6 = | 1 | | |
| DATA 7 = | 21 | | |
| DATA 8 = | 0 | | |
| 001 STR NOT | | CR | 5 |
| 002 JMP | | | 5 |
| 003 SET | | CR | 1 |
| 004 SET | | CR | 5 |
| 005 SET NOT | | CR | 2 |
| 006 SET | | CR | 3 |
| 007 SET | | CR | 4 |

As indicated above, each step of the program begins with a number, e.g., 001 indicating the number of that step in the program, followed by a pneumonic indicating the function to be carried out and concluding with a designation of that data register, auxiliary register or controlled relay in which data is taken from or transferred to. For example, step 3 sets the control relay 1. It is understood that the program as executed by the microprocessor of the programmable controller 280 is comprised of the following subroutines that are repetitively executed in sequence at a rate of 33 Hz.

The STATIONARY MODE subroutine includes steps 8 to 28 set out as follows:

| STATIONARY MODE | | | |
|---|---|---|---|
| 008 STR NOT | IN | 101 | |
| 009 AND NOT | IN | 102 | |
| 010 AND NOT | IN | 105 | |
| 011 JMP | | 16 | |

-continued

| STATIONARY MODE | | | |
|---|---|---|---|
| 012 SET | | OUT | 117 |
| 013 SET | | OUT | 118 |
| 014 SET | | OUT | 121 |
| 015 SET | | OUT | 122 |
| 016 SET | | OUT | 127 |
| 017 SET | | OUT | 129 |
| 018 SET | | OUT | 131 |
| 019 SET NOT | | OUT | 119 |
| 020 SET | | OUT | 120 |
| 021 SET | | OUT | 123 |
| 022 SET | | OUT | 124 |
| 023 SET | | OUT | 125 |
| 024 SET | | OUT | 129 |
| 025 SET | | OUT | 130 |
| 026 SET | | CR | 6 |
| 027 LD | | DATA | 5 |
| 028 STD | | DATA | 8 |

The STATIONARY MODE subroutine serves, as indicated above, to apply a positive DC voltage to energize with a constant voltage the magnets 104 and 106, and to denergize the eccentric drive motor 150, whereby the electromagnetic crawler 10 is attached to the shell 14 in a given position. Briefly, steps 8, 9 and 10 respectively determine whether the counter direction switch 288 and the crawler descent switch 290 are set and, if not, executes in sequence steps 12 through 25 to render conductive triacs 17, 18, 21, 22, 27, 29 and 31, while turning off triacs 19, 20, 23, 24, 25, 28 and 30. The result of executing these steps is to apply a positive potential from the power supply 318 to each of the magnets 104a and b, and 106a and b. By turning off the triac 25 of the I/O array 310b, the eccentric drive motor 150 is deenergized.

Next, the program moves to the COUNTER CLOCKWISE (CW) MOTION subroutine as set out in the following steps 29 to 59:

| CW Motion | | | | |
|---|---|---|---|---|
| 029 | STR | | IN | 101 |
| 030 | AND | NOT | IN | 104 |
| 031 | AND | NOT | CR | 6 |
| 032 | JMP | | | 17 |
| 033 | SET | | OUT | 125 |
| 034 | SET | | CR | 7 |
| 035 | SET | NOT | OUT | 131 |
| 036 | STR | | IN | 106 |
| 037 | JMP | | | 1 |
| 038 | SET | | OUT | 126 |
| 039 | STR | NOT | IN | 106 |
| 040 | JMP | | | 1 |
| 041 | SET | NOT | OUT | 126 |
| 042 | STR | NOT | IN | 103 |
| 043 | AND | | CR | 1 |
| 044 | JMP | | | 6 |
| 045 | SET | | OUT | 121 |
| 046 | SET | | OUT | 122 |
| 047 | SET | | OUT | 129 |
| 048 | SET | NOT | OUT | 117 |
| 049 | SET | | OUT | 118 |
| 050 | SET | | OUT | 127 |
| 051 | STR | NOT | IN | 103 |
| 052 | AND | | CR | 3 |
| 053 | JMP | | | 6 |
| 054 | SET | | OUT | 117 |
| 055 | SET | | OUT | 118 |
| 056 | SET | | OUT | 127 |
| 057 | SET | NOT | OUT | 121 |
| 058 | SET | | OUT | 122 |
| 059 | SET | | OUT | 129 |

In summary, the CW MOTION subroutines responds when the CW switch 288b is closed, to alternately turn the left magnets 104a and 106a and the right magnets 104b and 106b on and off in response to the train of signals from the optical switch 174 (see FIG. 10) associated with the indicator wheel 170 coupled to the eccentric drive motor 150. Initially, step 29 examines the LED 1 of the I/O array 310c to determine whether the CW switch 288b has been closed. Then, step 30 looks at the LED 4 of the I/O array 310c to determine that the up/down counter 282 has not counted out and the control relay 6 is not set to determine that the value of the up/down counter 282 and the preset thumb wheel value, 284, are not equal and, if these conditions are met, the succeeding steps of this subroutine are executed. If not, the program moves to the next COUNTER CLOCKWISE MOTION subroutine. Next in step 33, the triac 25 of the I/O array 310b is turned on, i.e., the eccentric drive motor 150 is turned on, before step 34 initializes the direction correction control relay 7 for a single scan. Step 35 turns off the triac 31 of the I/O array 310d, to load the count previously entered in the thumb wheel switch 284 into the up/down counter 282. Next, step 36 determines whether the left/right switch 286 has been closed. If closed, there is an indication that the electromagnetic crawler 10 has been disposed within the nuclear steam generator 12 to the left of the hand hole 30, and, if open, the electromagnetic crawler 10 has been disposed to the right of the hand hole 30. If disposed to the left, step 38 turns on the triac 26 of the I/O array 310e, whereby the up/down counter 282 is counted up. If disposed to the right, step 41 turns off the triac 26 to count down the counter 282.

The control relays 1 to 4, as identified above, are set in the course of the ECCENTRIC WINDOW ORIENTATION subroutine to keep track of the motion of the parallelogram drive frame 102 and to selectively control the energization of the magnets 104 and 106. Step 42 examines the LED 003 of the I/O array 310c to determine the presence of an output from the optical switch 174 (see FIG. 10), indicating that one of the openings 171 of the indicator wheel 170 is aligned therewith. Step 43 examines whether the control relay 1 is set indicating that the parallelogram drive frame 102 is opening. If both steps 42 and 43 are positive, indicating that the eccentric 160 and its drive arm 164 is a time t1 in its cycle as shown in FIG. 12B, steps 45 to 47 respectively turn on triacs 21, 22 and 29, thereby energizing the right upper and lower magnets 104b and 106b, while steps 48 to 50 deenergize triacs 17, 18 and 27, thereby deenergizing the upper and lower left magnets 104a and 106a. If the determinations of steps 42 and 43 are not positive, this subroutine moves to steps 51 and 52 to again determine whether there is an output from the optical switch 174 indicating the passage of an opening 171, and whether the control relay 3 is indicating that the parallelogram drive frame 102 is closing. If both of these conditions are met, steps 54 to 59 are executed to respectively energize triacs 17, 18 and 27 and to deenergize triacs 21, 22 and 29, whereby the left upper and lower magnets 104a and 106a are energized and the right upper and lower magnets 104b and 106b are deenergized. If these conditions are met, the eccentric 160 and drive arm 164 are disposed at time t2 as shown in FIG. 12B. It is realized that the program and, thus, the CW MOTION subroutine is executed some 33 times per second, whereby the position of the indicator wheel 170 is sensed to determine the presence of one of its openings 171a and 171b and the previous setting of the control relays 1 to 4 as set by the ECCENTRIC WINDOW ORIENTATION subroutine, to be explained. The outputs from the optical switch 174 and the condition of the control relays 1 to 4 positively indicates the position of the drive 164 and the movement of the parallelogram drive frame 102.

Next, the COUNTER CLOCKWISE (CCW) MOTION subroutine is executed, set out as follows:

| CCW Motion | | | | |
|---|---|---|---|---|
| 060 | STR | | IN | 102 |
| 061 | AND | NOT | IN | 104 |
| 062 | AND | NOT | CR | 6 |
| 063 | JMP | | | 17 |
| 064 | SET | | OUT | 125 |
| 065 | SET | | CR | 7 |
| 066 | SET | NOT | OUT | 131 |
| 067 | STR | | IN | 106 |
| 068 | JMP | | | 1 |
| 069 | SET | NOT | OUT | 126 |
| 070 | STR | NOT | IN | 106 |
| 071 | JMP | | | 1 |
| 072 | SET | | OUT | 126 |
| 073 | STR | NOT | IN | 103 |
| 074 | AND | | CR | 3 |
| 075 | JMP | | | 6 |
| 076 | SET | | OUT | 121 |
| 077 | SET | | OUT | 122 |
| 078 | SET | | OUT | 129 |
| 079 | SET | NOT | OUT | 117 |
| 080 | SET | | OUT | 118 |
| 081 | SET | | OUT | 127 |
| 082 | STR | NOT | IN | 103 |
| 083 | AND | | CR | 1 |
| 084 | JMP | | | 6 |
| 085 | SET | | OUT | 117 |
| 086 | SET | | OUT | 118 |
| 087 | SET | | OUT | 127 |
| 088 | SET | NOT | OUT | 121 |
| 089 | SET | | OUT | 122 |
| 090 | SET | | OUT | 123 |

The CCW MOTION subroutine examines the position of the indicator wheel 170 and the control registers 1 to 4 to energize the left and right magnets 104 and 106, in a similar manner to the CW MOTION subroutine, explained above. In summary, the CCW MOTION subroutine determines when the CCW switch 288a is closed (step 60) and the up/down counter 282 has not counted out (step 61) to alternatively energize the left and right magnets as shown in FIG. 12C. The CCW MOTION subroutine energizes the eccentric drive motor 150 (step 64), transfers the count set from the thumb wheel switch 284 into the up/down counter 282 (step 66), commands the up/down counter 282 to count down if the electromagnetic crawler 10 is located on the left side of the hand hole 30 (steps 67 and 69) or up if on the right side (steps 70 and 72), and alternatively energizes the left magnets, while deenergizing the right magnets (steps 76 to 81), or energizes the right magnets, while deenergizing the left magnets (steps 85 to 90).

The AFTER COUNT-OUT subroutine monitors the LED 04 of the I/O array 310F to sense when the up/down counter 282 has counted out, indicating that the electromagnetic crawler 10 has moved to its selected location. This subroutine includes the following steps:

| Stationary Mode After Count-Out | | | |
|---|---|---|---|
| 091 | STR | IN | 104 |
| 092 | JMP | | 8 |

-continued

| | Stationary Mode After Count-Out | | |
|---|---|---|---|
| 093 | SET | OUT | 117 |
| 094 | SET | OUT | 118 |
| 095 | SET | OUT | 121 |
| 096 | SET | OUT | 122 |
| 097 | SET | OUT | 127 |
| 098 | SET | OUT | 129 |
| 099 | SET | CR | 6 |
| 100 | SET NOT | OUT | 125 |

Step 91 monitors the LED 04 of the I/O array 310F and if it is on, the following steps 93 to 100 are executed; if not, the program jumps to the following ECCENTRIC WINDOW ORIENTATION subroutine. Steps 93 to 98 renders conductive triacs 17, 18, 21, 22, 27 and 29 of the I/O array 310a, whereby each of the magnets 104a and b, and 106a and b is energized to secure the electromagnetic crawler 10 to the shell 14. Thereafter, step 99 sets on the control relay 6 indicating that the azimuth or up/down counter 282 has counted out, before step 100 turns off the triac 25 of the I/O array 310b, thus deenergizing the eccentric drive 150.

The ECCENTRIC WINDOW ORIENTATION subroutine sets the control registers 1 to 4 in response to signals from the optical switch 174 as indicating the passage of one of the openings 171a and 171b of the indicator wheel 170. The status of the control relays 1 to 4 is illustrated in FIG. 12D as a function of the relative position of the drive arm 164 in its cycle, as shown in FIG. 12A. The digital signals set into the control relays 1 to 4 identify four distinct zones or phases of the movement of the drive arm 164 and, thus, position of the parallelogram drive frame 102. The control relays 1 to 4 are set under the control of the ECCENTRIC WINDOW ORIENTATION subroutine, which is set out as follows:

| | Eccentric Window Orientation | | |
|---|---|---|---|
| 101 | STR NOT | IN | 103 |
| 102 | AND | CR | 1 |
| 103 | JMP | | 2 |
| 104 | SET | CR | 2 |
| 105 | SET NOT | CR | 4 |
| 106 | STR | IN | 103 |
| 107 | AND | CR | 2 |
| 108 | JMP | | 2 |
| 109 | SET | CR | 3 |
| 110 | SET NOT | IN | 1 |
| 111 | STR NOT | IN | 103 |
| 112 | AND | CR | 3 |
| 113 | JMP | | 2 |
| 114 | SET | CR | 4 |
| 115 | SET NOT | CR | 2 |
| 116 | STR | IN | 103 |
| 117 | AND | CR | 4 |
| 118 | JMP | | 2 |
| 119 | SET | CR | 1 |
| 120 | SET NOT | CR | 3 |

In particular, if an output is not present from the optical switch 174, as determined by step 101, and the control relay 1 is set on as determined by step 102, then step 104 sets on the control relay 2 and step 105 sets off the control relay 4 indicating that the parallelogram drive frame 102 is closing and that one of the openings 171a and 171b is not aligned with the optical switch 174. If the condition sensed by steps 101 and 102 are not both met, the ECCENTRIC WINDOW ORIENTATION subroutines jumps 2 steps to steps 106 and 107, which respectively determines the presence of the output from the optical switch 174 and whether the control relay is set on. If both of these conditions are met, the control relay 3 is set on and the control relay 1 is set off, indicating that the parallelogram drive frame 102 is opening. If not, this subroutine jumps to steps 111 and 112, which respectively determine the absence of a signal from the optical switch 174, and whether the control relay 3 is set on. If both of these conditions are met, the control relay 4 is set on and the control relay 2 is set off, indicating that the parallelogram drive frame 102 is closing. If the response to steps 111 and 112 is negative, this subroutine jumps to steps 117 and 118 to determine whether the control relay 4 is set on and the presence of an output signal from the optical switch 174, to respectively set on the control relay 1 and set the control relay 3 off, thus indicating that the parallelogram drive frame 102 is opening and that one of the openings 171a and 171b is aligned with its optical switch 174. In summary, steps 101 to 120 sequentially review the control relays 1 to 4 and determine the presence or absence of an output from the optical switch 174 to respectively set on and off the control relays 1 to 4. Thus, the control relays may be set in four distinct combinations to identify where the drive arm 164 is disposed at any instant of time in its cycle of movement.

The DESCENT MOTION subroutine controls the descent of the electromagnetic crawler 10 by applying repetitive voltages of opposite polarity to the magnets 104 and 106 and providing a relatively long intermediate period therebetween of substantially zero voltage. As a result, the adhesion between the magnet is 104 and 106 and the shell 14 is reduced, permitting the electromagnetic crawler 10 to slide controllably down the peripheral surface of the shell 14. The voltage waveform as applied to the magnets 104 and 106 is illustrated in FIG. 12B under the heading of "Descent Motion". Briefly, the times of energization and deenergization are set by initializing set points in the magnets on/off data registers 1 to 4, as indicated in FIG. 12B. An index data register 6 is incremented as a function of time and is compared with each of the magnets on/off data registers 1 to 4 and, upon detecting a match therebetween, a corresponding voltage is applied or removed from the magnets 104 and 106. As indicated in FIG. 12B, the magnets 104 and 106 are cycled at a rate of 160 times per minute during a horizontal movement and approximately 300 times per minute during a vertical descent. As explained above with respect to FIGS. 12A, B and C, the cyclical energization and deenergization of the magnets 104 and 106 during horizontal movement of the electromagnetic crawler 10 and, thus, the horizontal speed of the electromagnetic crawler 10 is determined by the RPM of the eccentric drive motor 150. On the other hand, the cyclical energization and deenergization of the magnets 104 and 106 during the DESCENT MOTION subroutine is controlled, as will be described below, by the points in the data registers 1 to 4 and the rate at which the entire program is executed. In turn, the set points and program execution rate are determined empirically to control the cycle time of energizing the magnets 104 and 106, as shown in FIG. 12B, as a function of the friction coefficient between the magnets 104 and 106 and the surface of the shell 14, and the rate of flux field increase and decrease in the magnets 104 and 106.

The steps of the DESCENT MOTION subroutine are set out below:

| Descent Motion | | | |
|---|---|---|---|
| 121 | STR | IN | 105 |
| 122 | JMP | | 26 |
| 123 | LD | DATA | 8 |
| 124 | > | DATA | 1 |
| 125 | JMP | | 6 |
| 126 | SET | OUT | 117 |
| 127 | SET | OUT | 118 |
| 128 | SET | OUT | 121 |
| 129 | SET | OUT | 122 |
| 130 | SET | OUT | 127 |
| 131 | SET | OUT | 129 |
| 132 | LD | DATA | 8 |
| 133 | > | DATA | 2 |
| 134 | JMP | | 6 |
| 135 | SET NOT | OUT | 117 |
| 136 | SET | OUT | 118 |
| 137 | SET | OUT | 121 |
| 138 | SET | OUT | 122 |
| 139 | SET | OUT | 127 |
| 140 | SET | OUT | 129 |
| 141 | LD | DATA | 8 |
| 142 | > | DATA | 3 |
| 143 | JMP | | 6 |
| 144 | SET | OUT | 119 |
| 145 | SET | OUT | 120 |
| 146 | SET | OUT | 123 |
| 147 | SET | OUT | 124 |
| 148 | SET | OUT | 128 |
| 149 | SET | OUT | 130 |
| 150 | LD | DATA | 8 |
| 151 | > | DATA | 4 |
| 152 | JMP | | 6 |
| 153 | SET NOT | OUT | 119 |
| 154 | SET | OUT | 120 |
| 155 | SET | OUT | 123 |
| 156 | SET | OUT | 124 |
| 157 | SET | OUT | 128 |
| 158 | SET | OUT | 130 |
| 159 | LD | DATA | 7 |
| 160 | = | DATA | 8 |
| 161 | JMP | | 1 |
| 162 | LD | DATA | 5 |
| 163 | STD | DATA | 8 |
| 164 | LD | DATA | 8 |
| 165 | ADD | DATA | 6 |
| 166 | STO | DATA | 8 |

Step 121 examines the LED 05 of the I/O array 310c to determine whether the crawler descent switch 290 is closed to command a descent or downward motion of the electromagnetic crawler 10. If not, the program jumps in step 122 to the next DIRECTION CORRECTION subroutine. If closed, steps 123 and 124 compare the counts stored in an actual count data register 8 with the initialzed count in data register 1. In the INITIALIZATION subroutine, the magnets on/off data registers 1, 2, 3 and 4 were loaded with set points or counts controlling the times for turning on and off the magnets 104 and 106 as shown in FIG. 12B. The actual count data register 8 is used as a counter that is indexed each time the DESCENT MOTION subroutine is executed, realizing that the entire program requires 30 milliseconds to execute and is executed some 33 times per second. If the count in the actual count data register 8 is greater than that count stored in the magnets on data register 1, the DESCENT MOTION subroutine jumps to step 132. Otherwise, steps 126 to 131 are executed to turn on the triacs 17, 18, 21, 22, 27 and 29 of the I/O array 310a, whereby each of the magnets 104 and 106 is turned on at a point time determined by the count placed in the magnets/on data register 1. Similarly in steps 132 and 133, the index count in the actual count data register 8 is compared with that stored data in the magnets/off register 2 and, if greater, the DESCENT MOTION subroutine moves to steps 141 and 142. Otherwise, in steps 135 to 140, the triacs 17, 18, 21, 22, 27 and 29 are rendered non-conductive and the magnets 104 and 106 are deenergized. Next, steps 141 and 142 compares the index count in the actual count data register 8 with that count initialized in the magnets/on data register 3 and, if greater, the DESCENT MOTION subroutine jumps to steps 150 and 151; if not, steps 144 to 149 renders the triacs 19, 20, 23, 24, 28 and 30 conductive, whereby a negative voltage is applied to the magnets 104 and 106. Next, steps 150 and 151 compare the index count of the actual count data register 8 with the initialized count of the magnets/off data register 4 and, if greater, the DESCENT MOTION subroutine jumps to step 159. Otherwise, steps 153 to 158 turn off the triacs 19, 20, 23, 24, 28 and 30, whereby the energizing voltage is removed from the magnets 104 and 106. Then, steps 159 and 160 compare the initialized count, e.g., 21, stored in data register 7 with the current count in the actual count data register 8 and if equal, indicating a completion of a cycle, the index data register 8 is reset by transferring a zero thereto from data register 5. If a cycle is not complete, step 164 adds a one as stored in the data register 6 to the index data register 8.

Summarizing the operation of the DESCENT MOTION subroutine for the illustrative counts as initialized in the data registers 1 to 7, it is seen that for the first cycle of program execution, that a positive voltage is applied to energize the magnets 104 and 106. For the 2nd through 11th cycles, the magnets 104 and 106 are deenergized. For the 12th cycle, a negative going voltage is applied to the magnets 104 and 106. On the 13th through 21st cycles of the program, voltages are removed from the magnets 104 and 106, before the index register is reset to zero. After each execution of the DESCENT MOTION subroutine, the data register 8 is indexed by one.

The DIRECTION CORRECTION subroutine sets or resets the movement of the electromagnetic crawler 10 to correspond with the setting of the CW or CCW switches 288b and 288a in response to the closing of the direction reset switch 292. Between periods of use within the nuclear steam generator 12, the sense of direction maintained by the programmable controller 280 as to whether the electromagnetic crawler 10 is moving in a counter clockwise or clockwise direction about the peripheral of the shell 14, may become lost. This sense of direction is determined by the relative relationship between the openings 171a and 171b of the indicator wheel 170 and the position of the drive arm 164, i.e., whether the parallelogram drive frame 102 is opening or closing. If this sense of direction becomes lost, it is necessary to close the direction reset switch 292, whereby the sense of direction as retained in a direction correction control register is reversed. Thus, the DIRECTION CORRECTION subroutine responds to the closing of the direction reset switch 292 to reset the control relay 7. The steps of the DIRECTION CORRECTION subroutine are set out as follows:

| Direction Correction | | | |
|---|---|---|---|
| 167 | STR | | 109 |
| 168 | JMP | | 20 |
| 169 | STR | CR | 1 |
| 170 | AND | CR | 2 |

-continued

| | Direction Correction | | |
|---|---|---|---|
| 171 | AND | CR | 7 |
| 172 | JMP | | 5 |
| 173 | SET | CR | 3 |
| 174 | SET | CR | 4 |
| 175 | SET NOT | CR | 1 |
| 176 | SET | CR | 2 |
| 177 | SET | CR | 7 |
| 178 | STR | CR | 2 |
| 179 | AND | CR | 3 |
| 180 | AND | CR | 7 |
| 181 | JMP | | 5 |
| 182 | SET | CR | 1 |
| 183 | SET | CR | 4 |
| 184 | SET NOT | CR | 2 |
| 185 | SET | CR | 3 |
| 186 | SET | CR | 7 |
| 187 | STR | CR | 3 |
| 188 | AND | CR | 4 |
| 189 | AND | CR | 7 |
| 190 | JMP | | 5 |
| 191 | SET | CR | 1 |
| 192 | SET | CR | 2 |
| 193 | SET NOT | CR | 3 |
| 194 | SET | CR | 4 |
| 195 | SET | CR | 7 |
| 196 | STR | CR | 1 |
| 197 | AND | CR | 4 |
| 198 | AND | CR | 7 |
| 199 | JMP | | 5 |
| 200 | SET | CR | 2 |
| 201 | SET | CR | 3 |
| 202 | SET NOT | CR | 1 |
| 203 | SET | CR | 4 |
| 204 | SET | CR | 7 |

In particular, step 167 examines the LED 09 of the I/O array 310c to determine whether the direction reset switch 292 has been closed and, if not, the program jumps 20 steps to continue the program with the execution of the TILT CORRECTION subroutine. If closed, the direction subroutine then proceeds the examine the control relays 1 to 4 and to reverse the setting of the direction correction control relay 7 based upon the current condition thereof. In particular, steps 169, 170 and 171 determine whether the control relays 1, 2 and 7 are set on and, if not, the subroutine jumps five instructions. If on, steps 173 and 174 set on control relays 3 and 4 and off control relays 1, 2 and 7. Next steps 178 to 180 determine whether control relays 2, 3 and 7 are on and, if so, sets on control relays 1 and 4 and off control relays 2, 3 and 7. Steps 187 to 189 determine whether control relays 3, 4 and 7 are on and, if so, sets on control relays 1 and 2 and off control relays 3, 4 and 7. Next, steps 196 to 198 determine whether control relays 1, 4 and 7 are on and, if so, sets on control relays 2 and 3 and off control relays 1, 4 and 7.

The TILT CORRECTION subroutine responds to the tilt sensor 112 to selectively adjust the direction of movement of the electromagnetic crawler 10 depending upon its direction of travel, i.e., clockwise or counter clockwise, about the periphery of the shell 14 as viewed from the top of the nuclear steam generator 12, and the direction of tilt, i.e., a clockwise or counter clockwise tilt with respect to vertical as seen in FIG. 6. In particular, the leading magnet on the trailing side of the electromagnetic crawler 10 is turned off when the tilt sensor 112 indicates that the electromagnetic crawler 10 is moving on a non-horizontal path or a predetermined time period has expired, which ever occurs first. Initially, the TILT CORRECTION subroutine responds to the interruption of one of the optical switches 218a or 218b to initiate indexing of the index auxiliary register 2, understanding that the count stored therein is incremented with the each repetitive execution of the program. When the count retained in the index auxiliary register 2 equals the initialized count in the start tilt correction auxiliary register 5, a selected one of the four magnets 104a and b, and 106a and b is turned off to start the correction. When the electromagnetic crawler 10 reaches a horizontal or level path and the signal from the optical switch 218a or 218b is removed, the index auxiliary register 2 is reset to zero and the deenergized magnet is turned back on. However if the tilt sensor 112 is not operating properly and, thus, the index auxiliary register 2 reaches a count as stored in the stop tilt correction auxiliary register 4 before the signal from the optical switch 218a or 218b is removed, the index auxiliary register 2 is reset and the deenergized magnet turned back on. The stop tilt correction auxiliary register 4 serves as a back-up to prevent over correction if one of the optical switches 218a or 218b fails to operate correctly. The steps of the TILT CORRECTION subroutine are shown as follows:

| | Tilt Correction | | |
|---|---|---|---|
| 205 | STR | IN | 107 |
| 206 | AND | IN | 101 |
| 207 | AND | CR | 8 |
| 208 | JMP | | 2 |
| 209 | SET | OUT | 132 |
| 210 | SET NOT | OUT | 127 |
| 211 | STR | IN | 107 |
| 212 | AND | IN | 102 |
| 213 | AND | CR | 8 |
| 214 | JMP | | 2 |
| 215 | SET | OUT | 132 |
| 216 | SET NOT | OUT | 121 |
| 217 | STR | IN | 108 |
| 218 | AND | IN | 101 |
| 219 | AND | CR | 9 |
| 220 | JMP | | 2 |
| 221 | SET | OUT | 132 |
| 222 | SET NOT | OUT | 117 |
| 223 | STR | IN | 108 |
| 224 | AND | IN | 102 |
| 225 | AND | CR | 9 |
| 226 | JMP | | 2 |
| 227 | SET | OUT | 132 |
| 228 | SET NOT | OUT | 129 |
| 229 | STR | IN | 101 |
| 230 | OR | IN | 102 |
| 231 | AND | IN | 107 |
| 232 | JMP | | 2 |
| 233 | LD | AUX | 3 |
| 234 | ADD | AUX | 2 |
| 235 | STO | AUX | 3 |
| 236 | LD | AUX | 3 |
| 237 | > | AUX | 5 |
| 238 | JMP | | 1 |
| 239 | SET | CR | 8 |
| 240 | STR | IN | 101 |
| 241 | OR | IN | 102 |
| 242 | AND | IN | 108 |
| 243 | JMP | | 2 |
| 244 | LD | AUX | 3 |
| 245 | ADD | AUX | 2 |
| 246 | STO | AUX | 3 |
| 247 | LD | AUX | 3 |
| 248 | > | AUX | 5 |
| 249 | JMP | | 1 |
| 250 | SET | CR | 9 |
| 251 | LD | AUX | 3 |
| 252 | > | AUX | 4 |
| 253 | JMP | | 4 |
| 254 | LD | AUX | 1 |
| 255 | STO | AUX | 3 |
| 256 | SET NOT | CR | 8 |
| 257 | SET | CR | 9 |
| 258 | SET | OUT | 132 |

| -continued | |
|---|---|
| Tilt Correction | |
| 259 NET | 0 |

The auxiliary registers 1 to 5 are used to time the functions of the TILT CORRECTION subroutine. After one of the optical switches 218a and 218b provides an output signal indicating a tilt in one direction or the other, the actual count auxiliary register 3 is incremened with each cycle of the program. The CCW tilt correction control relay 8 and the CW tilt correction control relay 9 are initially set-off. When the actual count auxiliary register 3 has been incremented to a predetermined count corresponding to an interval to permit the programmable controller 280 to ignore momentary jars to the electromagnetic crawler 10, the CCW tilt correction control relay 8 and the CW tilt correction control relay 9 are set on and a selected magnet is deenergized dependent upon the direction of travel of the electromagnetic crawler 10 and the direction of tilt. The program will repetitively cycle through the TILT CORRECTION subroutine without taking action until one of the optical switches 218a and 218b of the tilt sensor 112 provides an output signal indicative of a corresponding tilt of the electromagnetic crawler 10. If there is a clockwise tilt from the vertical as seen in FIG. 6, the optical switch 218b provides an output signal via the bus 304 to energize the LED 108. If there is a counter clockwise tilt, the optical switch 218a provides a signal via the bus 304 to energize the LED 07 of the I/O array 310c. In particular, steps 229, 230 and 231 sense that either of the CCW direction switch 288a or CW direction switch 288b has been closed and that a signal is received from the optical switch 218a, to index by one the actual count auxiliary register 3. In a similar fashion, after the initial delay period corresponding to 100 cycles of the program, step 239 sets on the CCW tilt correction control relay 8. Similarly, steps 240, 241 and 242 determine that one of the CCW direction switch 288a and CW direction switch 288b has been thrown and that a signal is output by the optical switch 218b to increment in step 246 the actual count of the auxiliary register 3. After the initial delay period, step 250 sets the CW tilt correction control relay 9.

After the initial delay period and one of the tilt correction control relays 8 or 9 has been set, the TILT CORRECTION subroutine operates in the following fashion. Steps 205, 206 and 207 examine the LED's 07 and 01, and the CCW tilt correction control relay 8 to determine that the clockwise direction switch 288b has been closed, that output signal from the optical switch 218a is received and that the CCW tile correction control relay 8 has been set to energize in step 309 a triac 32 (not shown) to indicate that a tilt correction is in process and in step 210 to turn off the triac 27, thereby deenergizing the lower left magnet 106a. If the conditions tested by steps 205, 206 and 207 are not met, the subroutine jumps to steps 211, 212 and 213, which determines that the optical switch 218a outputs a signal, the CCW direction switch 288a is closed and that the CCW tilt correction control relay 8 is set to thereby provide in step 215 an indication that a tilt correction is in process and to deenergize in step 216 the upper right magnet 104b. The TILT CORRECTION subroutine continues in steps 217, 218 and 219 to sense that the output from the optical switch 218b, that the CW direction switch 288b is closed and that the CW tilt correction control relay 9 is set to provide an indication that a tilt correction is in process and to deenergize in step 222 the upper left magnet 104a. In steps 223, 224 and 225, the presence of the output signal from the optical switch 218b is sensed, the closing of the CCW direction switch 288a is sensed and the setting of the CW tilt correction control relay 9 is sensed to provide in step 227 an indication that the tilt correction process is occurring and to turn off in step 228 the lower right magnet 106b.

As explained above, steps 233 to 239, increment by one the actual count auxiliary register for each execution of the TILT CORRECTION subrouting and compares that current count with that count initially stored in the start tilt correction auxiliary register 5. If greater, the CCW tilt correction control relay 8 is set. Steps 240 to 248 sense the presence of the output signal from the optical switch 218b to index the acutal count auxiliary register 3 and to determine whether the delay period is over and, if so, to set the CW tilt correction control relay 9. Steps 251 and 252 determine whether tilt correction has occurred for a predetermined period, e.g., 600 cycles of program execution, and, if that period has expired, the actual count auxiliary register 3 is reset to zero and the CCW tilt correction relay 8 and the tilt correction relay 9 are are set off, before step 259 effects a return to the initial program step, thus permitting continuous reexecution of the program.

In considering this invention, it should be remembered that the provided disclosure is illustrative only and the scope of this invention is to be determined by the appended claims.

We claim as our invention:

1. A vehicle controllably moved along a surface, said vehicle comprising:
   (a) a drive frame having first and second opposing legs, and third and fourth opposing legs, each of said third and fourth legs being pivotably secured at its ends to corresponding ends of said first and second legs respectively to form a frame-like structure;
   (b) drive means coupled between said first and second legs for repetitively driving said first and second legs in a first direction toward each other and in a second direction away from each other;
   (c) first and second magnet means mounted respectively on said first and second legs, and each being actuable to be attached to the surface and deactuable to be released from the surface; and
   (d) control means responsive to the movement of said first and second legs in the first direction for actuating one of said first and second magnet means and deactuating the other of said first and second magnet means, and responsive to the movement of said first and second legs in said second direction for actuating said other magnet means and deactuating said one magnet means.

2. The vehicle as claimed in claim 1, wherein said first magnet means comprises first and second magnets mounted on said first leg, and said second magnet means comprises third and fourth magnets mounted on said second leg.

3. A vehicle for controlled movement along a surface, said vehicle comprising:
   (a) a drive frame;
   (b) drive means mounted on said drive frame and repetitively operating to move said frame in increment of movement along the surface;

(c) means responsive to the movement of said vehicle with respect to the surface for providing a train of signals, each signal indicative of said increment of vehicle movement; and (d) control means for controlling said repetitive operating of said drive means and including counting means for receiving a count indicative of a present position of said vehicle and responsive to said train of signals to change said count, and means for comparing said changed count with said preset count and when said preset and said changed counts are equal providing a signal indicative that said vehicle has reached its destination, said control means responsive to said destination indicative signal for terminating said repetitive operating of said drive means.

4. The vehicle as claimed in claim 13, wherein said control means comprises vehicle direction selection means for operating said drive means to drive said vehicle in a first direction and in a second, different direction and said counting means counting up if said vehicle is moving in one of said first and second directions and counting down if said vehicle is moving in the other of said first and second directions.

5. The vehicle as claimed in claim 4, wherein said control means further comprises means set in a first mode if said vehicle is disposed on one side of a reference point to cause said counting means to count down if said vehicle is moving in said first direction and to count up if said vehicle is moving in said second direction, and in a second mode if said vehicle is disposed on the other side of said reference point to cause said counting means to count up if said vehicle is moving in said first direction and to count down if said vehicle is moving in said second direction.

6. A vehicle for controlled movement along a surface, said vehicle comprising:

(a) a drive frame comprised of first and second opposing legs, and third and fourth opposing legs, each of said third and fourth legs being pivotably connected at its ends to corresponding ends of said first and second legs to form said drive frame;

(b) drive means for repetitively opening and closing said drive frame;

(c) first and second attachment means mounted on said drive frame and being actuable to be attached to the surface and deactuable to be released from the surface, said first and second attachment means are respectively first and second magnets, each electrically energized to be attracted to the surface, each of said first and second magnets exhibits a gradual increase and decay of its attraction force in response respectively to the application and removal of an energizing signal; and (d) control means responsive to the opening and closing of said drive frame for alternately applying said energizing signal to one of said first and second magnets and removing said energizing signal from another of said first and second magnets at a point in time preceding said opening of said drive frame to permit the attraction force of said one magnet to increase and the attraction force of said other magnet to decay, before said drive frame begins to open.

7. The vehicle as claimed in claim 6, wherein said control means comprises a DC voltage source and first and second switch means respectively coupling said DC voltage source in circuit with said first and second magnets, said control means selectively actuating said first and second switch means to apply the energizing signal as a DC voltage to a corresponding one of the first and second magnets.

8. The vehicle as claimed in claim 7, wherein said control means further includes first and second diode means coupled in parallel circuit with said first and second switch means respectively and forwardly biased with respect to the decaying voltages in said first and second magnets to respectively protect said first and second switch means.

9. A vehicle for controlled movement along a surface, said vehicle comprising;

(a) a drive frame comprised of first and second opposing legs, and third and fourth opposing legs, each of said third and fourth legs being pivotably connected at its ends to corresponding ends of said first and second legs to form said drive frame;

(b) drive means comprising an electrically actuated motor, an eccentric rotatably driven by said motor and a drive arm coupled to said eccentric for opening and closing said drive frame, said drive arm including a drive end, said motor is mounted on said first leg and said driven end of said drive arm is coupled to said second leg, whereby said drive frame is opened and closed;

(c) first and second attachment means mounted respectively on said first and second legs and being actuable to be attached to the surface and deactuable to be released from the surface; and (d) control means responsive to said opening of said drive frame for actuating one of said first and second attachment means and for deactuating the other of said first and second attachment means, and responsive to said closing of said frame for actuating said other attachment means and deactuating said one attachment means, whereby said vehicle is driven across the surface.

10. The vehicle as claimed in claim 9, wherein said first attachment means comprises a first magnet affixed to said first leg and said second attachment means comprises a second magnet affixed to said second leg.

11. The vehicle as claimed in claim 9, wherein said motor rotates said eccentric and drives said drive are in a back and forth fashion between an extended position and a retracted position, said control means comprises means for sensing the position of said drive arm.

12. The vehicle as claimed in claim 11, wherein said sensing means comprises a disk rotatably coupled to said eccentric and having first and second openings therein, an optical sensing means responsive to the rotation of said each of said openings there past for providing a signal indicative thereof.

13. The vehicle as claimed in claim 12, wherein said disk is mounted relative to said drive arm and said eccentric to provide position signals in the course of a single revolution of said disk at predetermined points with respect to the opening and closing of said drive frame, respectively.

14. The vehicle as claimed in claim 13, wherein said sensing means further comprises logic means including first and second, third and fourth relays and evaluation means responsive to said position signals for setting on said first relay when said drive frame is opening and a position signal is present, setting on said second relay in the absence of a position signal and said drive frame is closing, for setting on said third relay in the presence of a position signal when said drive frame is closing and for setting on said fourth relay in the absence of a position signal when said drive frame is opening.

15. The vehicle as claimed in claim 14, wherein said control means comprises means responsive to said first and fourth control relays being set on and said second and third control relays being set off for energizing one of said first and second attachment means, and responsive to said first and fourth relays being set off and second and third relays being set on to energize the other of said first and second attachment means.

16. A vehicle controllably moved along a surface, said vehicle comprising:
 (a) a drive frame having first and second opposing legs, and third and fourth opposing legs, each of said third and fourth legs being pivotably secured at its ends to corresponding ends of said first and second legs to form said drive frame;
 (b) drive means coupled between said first and second legs for repetitively driving said first and second legs in a first direction toward each other and in a second direction away from each other;
 (c) first and second magnet means mounted respectively on said first and second legs, and each being actuable to be attached to the surface and deactuable to be released from the surface, said first magnet means comprises first and second magnets mounted on said first leg, and said second magnet means comprises third and fourth magnets mounted on said second leg; and
 (d) control means responsive to the movement of said first and second legs in the first direction for actuating one of said first and second magnet means and deactuating the other of said first and second magnet means, and responsive to the movement of said first and second legs in said second direction for actuating said other magnet means and deactuating said one magnet means, said control means being operative in a first mode for alternatively energizing and deenergizing said first and second magnet means to drive said vehicle along a given orientation, one of said first and second magnet means being a trailing magnet means considering the direction of vehicle movement, and in a second mode for selectively deenergizing a magnet of said trailing magnet means, whereby said vehicle is directed along a second orientation eschewed with respect to said given orientation.

17. The vehicle as claimed in claim 16, wherein said control means comprises tilt sensor means responsive to vehicle tilt for providing a tilt sensor indication, and means responsive to said tilt sensor indication for selecting which of said magnets of said trailing group to deenergize to direct said vehicle along said second orientation to compensate for the vehicle tilt.

18. The vehicle as claimed in claim 17, wherein said control means comprises vehicle direction means for selecting said first magnet means as said one magnet means to move said vehicle in a first direction and said second magnet means as said other magnet means to move said vehicle in a second different direction.

19. The vehicle as claimed in claim 18, wherein said control means is responsive to said vehicle direction means and to said tilt sensor indication for determining one of said first, second, third or fourth magnets to deenergize.

20. The vehicle as claimed in claim 19, wherein said control means further includes means for terminating the deenergizing of said one magnet after a predetermined period.

21. The vehicle as claimed in claim 20, wherein said control means comprises means for imparting a delay to the deenergization of said one magnet for a period sufficient to permit said control means to ignore relatively brief jars to said tilt sensor means.

22. A vehicle for controlled movement along a surface, said vehicle comprising:
 (a) a drive frame comprised of first and second opposing legs, and third and fourth opposing legs, each of said third and fourth legs being pivotably connected at its ends to corresponding ends of first and second legs respectively to form a frame-like structure;
 (b) drive means for repetitively opening and closing said drive frame;
 (c) first and second attachment means mounted respectively on said first and second legs and being actuable to be attached to the surface and deactuable to be released from the surface;
 (d) control means responsive to said opening of said drive frame for actuating one of said first and second attachment means and for deactuating the other of said first and second attachment means, and responsive to said closing of said frame for actuating said other attachment means and deactuating said one attachment means, whereby said vehicle is driven across the surface; and
 (e) vehicle direction selection means for setting said first attachment means as said one attachment means and said second attachment means as said other attachment means to drive said vehicle in a first direction, and for setting said first attachment means as said other attachment means and said second attachment means as said one attachment means to drive said vehicle in a second, different direction.

23. A vehicle for controlled downward movement along a surface under the influence of gravity, said vehicle comprising;
 (a) a drive frame;
 (b) magnet means mounted on said drive frame and responsive to the application of an energizing signal to be attached to the surface and to the removal of said energizing signal to be released from the surface; and
 (c) control means for varying the rate and magnitude of said energizing signal to a degree to effect a weakening of the forces of attraction of said magnet means to the surface, thus facilitating the downward movement of said vehicle on the surface, said control means cyclicly generating and applying said energizing signal to said magnet means as a voltage of a first polarity and a voltage of a second polarity opposite to said first polarity.

24. The vehicle as claimed in claim 23, wherein said control means removes voltage energization from said magnet means between the application of said voltages of said first and second polarities.

25. A vehicle controllably moved along a surface, said vehicle comprising:
 (a) a drive frame having first and second opposing legs, and third and fourth opposing legs, each of said third and fourth legs being pivotably secured at its ends to corresponding ends of said first and second legs to form said drive frame;

(b) drive means coupled between said first and second legs for repetitively driving said first and second legs in a first direction toward each other and in a second direction away from each other;

(c) first and second magnet means mounted respectively on said first and second legs, and each being responsive to the application of an energizing signal to be attached to the surface and to the removal of said energizing signal to be released from the surface, said first magnet means comprises first and second magnets mounted on said first leg, and said second magnet means comprises third and fourth magnets mounted on said second leg;

(d) said drive means mounted on said drive frame and repetitively operating to move said drive frame an increment of movement along the surface;

(e) means responsive to the movement of said vehicle with respect to the surface for providing a train of signals, each signal indicative of said increment of vehicle movement; and (f) control means operative in first and second modes, said control means responsive to the movement of said first and second legs in said first direction for actuating one of said first and second magnet means and deactuating the other of said first and second magnet means and responsive to the movement of said first and second legs in said second direction for actuating said other magnet means and deactuating said one magnet means, said control means is operative in said first mode for alternately energizing and deenergizing said first and second magnet means to drive said vehicle along a given orientation, one of said first and second magnet means being a trailing magnet means considering the direction of vehicle movement, said control means operating in said second mode for selectively deenergizing a magnet of said trailing magnet means, whereby said vehicle is directed along a second orientation eschewed with respect to said given orientation, said control means comprises tilt sensor means responsive to vehicle tilt for providing a tilt sensor indication, means responsive to said tilt sensor indication for selecting which of said magnets of said trailing group to deenergize to direct said vehicle along said second orientation to compensate for the vehicle tilt, said control means comprises vehicle direction selection means for selecting said first magnet means as said one magnet means to move said vehicle in a first vehicle direction and said second magnet means as said one magnet means to move said vehicle in a second, different vehicle direction, said control means being responsive to said vehicle direction means and to said tilt sensor indication for determining one of said first, second, third or fourth magnets to deenergize, said control means including means for varying the rate and magnitude of said energizing signal to a degree to effect a weakening of the forces of attraction of said magnet means to the surface, thus facilitating a downward movement of said vehicle on the surface, said control means including means for controlling said repetitive operating of said drive means and including counting means for receiving a count indicative of a present position of said vehicle and responsive to said train of signals to change said count, and means for comparing said changed counts with said preset count and when said preset count and said changed counts are equal providing a signal indicative that said vehicle has reached its destination, said control means responsive to said destination indicative signal for terminating said repetitively operating of said drive means.

26. A vehicle controllably moved along a surface, said vehicle comprising:

(a) a drive frame having first and second opposing legs, and third and fourth opposing legs, each of said third and fourth legs being pivotably secured at its ends to corresponding ends of said first and second legs respectively to form a frame-like structure;

(b) drive means coupled between said first and second legs for repetitively driving said first and second legs in a first direction toward each other and in a second direction away from each other;

(c) first and second magnet means mounted respectively on said first and second legs, each of said first and second magnet means being actuable to be attached to the surface and deactuable to be released from the surface, said first magnet means comprises first and second magnets mounted on said first leg, and said second magnet means comprises third and fourth magnets mounted on said second leg; and (d) control means responsive to the movement of said first and second legs in the first direction for actuating one of said first and second magnet means and deactuating the other of said first and second magnet means, and responsive to the movement of said first and second legs in said second direction for actuating said other magnet means and deactuating said one magnet means, said control means is operative in a first mode for alternatively energizing and deenergizing said first and second magnet means to drive said vehicle along a given orientation, one of said first and second magnet means being a trailing magnet means considering the direction of vehicle movement, and in a second mode for selectively deenergizing a magnet of said trailing magnet means, whereby said vehicle is directed along a second orientation eschewed with respect to said given orientation.

* * * * *